(12) United States Patent
Horn et al.

(10) Patent No.: US 11,114,759 B1
(45) Date of Patent: Sep. 7, 2021

(54) BEAMFORMING CIRCUIT FOR MULTIPLE ANTENNAS

(71) Applicant: QUALCOMM Incorporated, San Diego, CA (US)

(72) Inventors: Idan Michael Horn, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/993,903

(22) Filed: Aug. 14, 2020

(51) Int. Cl.
*H04B 7/06* (2006.01)
*H01Q 3/40* (2006.01)

(52) U.S. Cl.
CPC ............ *H01Q 3/40* (2013.01); *H04B 7/0617* (2013.01)

(58) Field of Classification Search
CPC .................................. H01Q 3/40; H04B 7/0617
See application file for complete search history.

(56) References Cited

U.S. PATENT DOCUMENTS

| | | | | |
|---|---|---|---|---|
| 5,610,617 A * | 3/1997 | Gans | ..................... | H01Q 3/24 342/148 |
| 6,218,987 B1 * | 4/2001 | Derneryd | ............... | H01Q 1/246 342/373 |
| 6,992,622 B1 * | 1/2006 | Chiang | .................... | H01Q 3/40 342/373 |
| 8,013,754 B2 * | 9/2011 | Shum | ................... | A63B 71/0622 340/692 |
| 10,566,693 B2 * | 2/2020 | Tsai | .......................... | H01Q 3/40 |
| 2002/0163478 A1 * | 11/2002 | Pleva | ...................... | G01S 7/354 343/853 |
| 2003/0038752 A1 * | 2/2003 | Park | ...................... | H01Q 25/008 343/757 |
| 2004/0110469 A1 * | 6/2004 | Judd | ....................... | G01S 19/25 455/15 |
| 2010/0321238 A1 * | 12/2010 | Shen | ..................... | H01Q 21/061 342/373 |
| 2012/0112963 A1 * | 5/2012 | Lee | ............................ | H03F 3/60 342/373 |
| 2013/0076565 A1 * | 3/2013 | Lee | ............................ | H01Q 3/40 342/373 |
| 2018/0337453 A1 * | 11/2018 | Tsai | .......................... | H01Q 3/40 |

* cited by examiner

*Primary Examiner* — Kenneth T Lam
(74) *Attorney, Agent, or Firm* — Arent Fox LLP

(57) ABSTRACT

Apparatus and methods for multi-antenna wireless communication are provided. In an aspect, one or more input ports of a first layer two-dimensional (2D) Butler matrix are selected for communication of one or more streams by an array antenna over one or more beams. A control signal is applied to a control input pin of a first layer to second layer switch configurable, based on the control signal, to selectively connect first layer output ports of the first layer 2D Butler matrix to at least a subset of second layer input ports of a second layer 2D Butler matrix. One or more streams are then transmitted or received by an array antenna over one or more beams, wherein the array antenna includes a plurality of antenna elements, wherein each one of the plurality of antenna elements is associated with one output port of the second layer 2D Butler matrix.

20 Claims, 12 Drawing Sheets

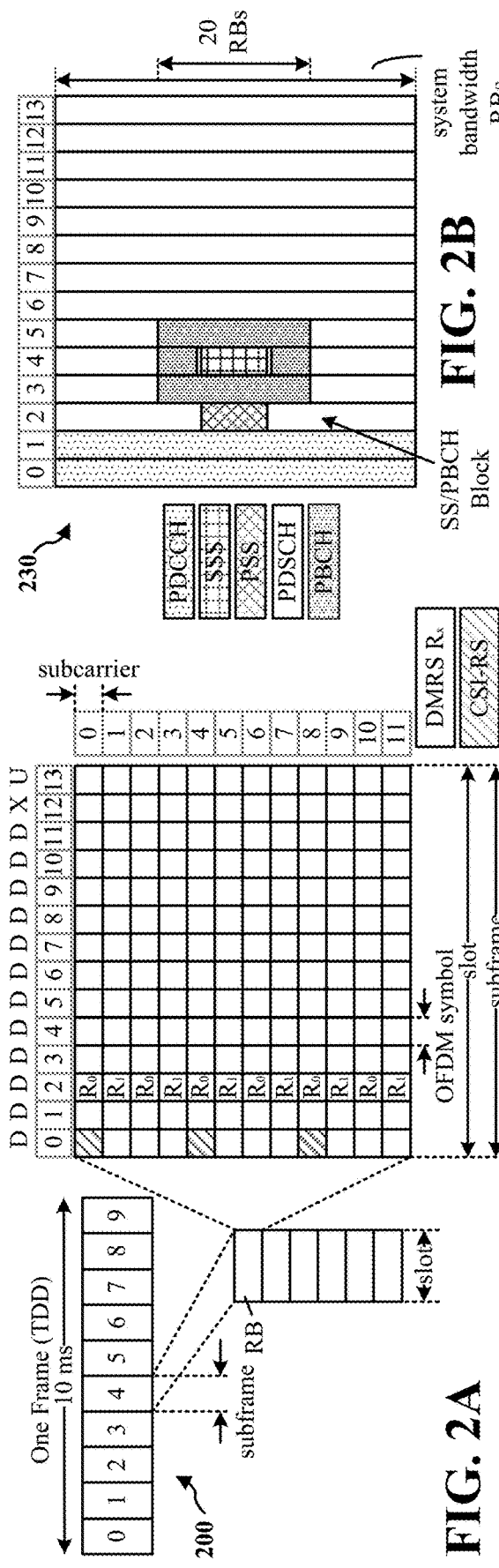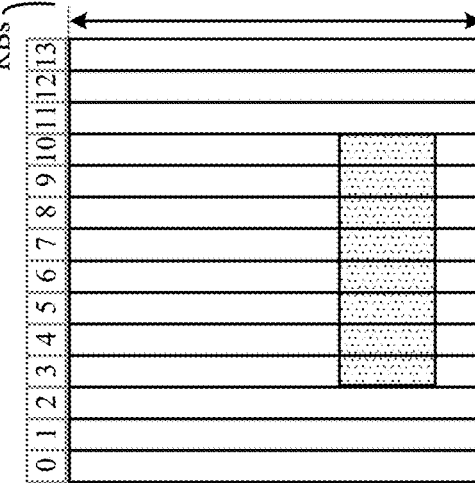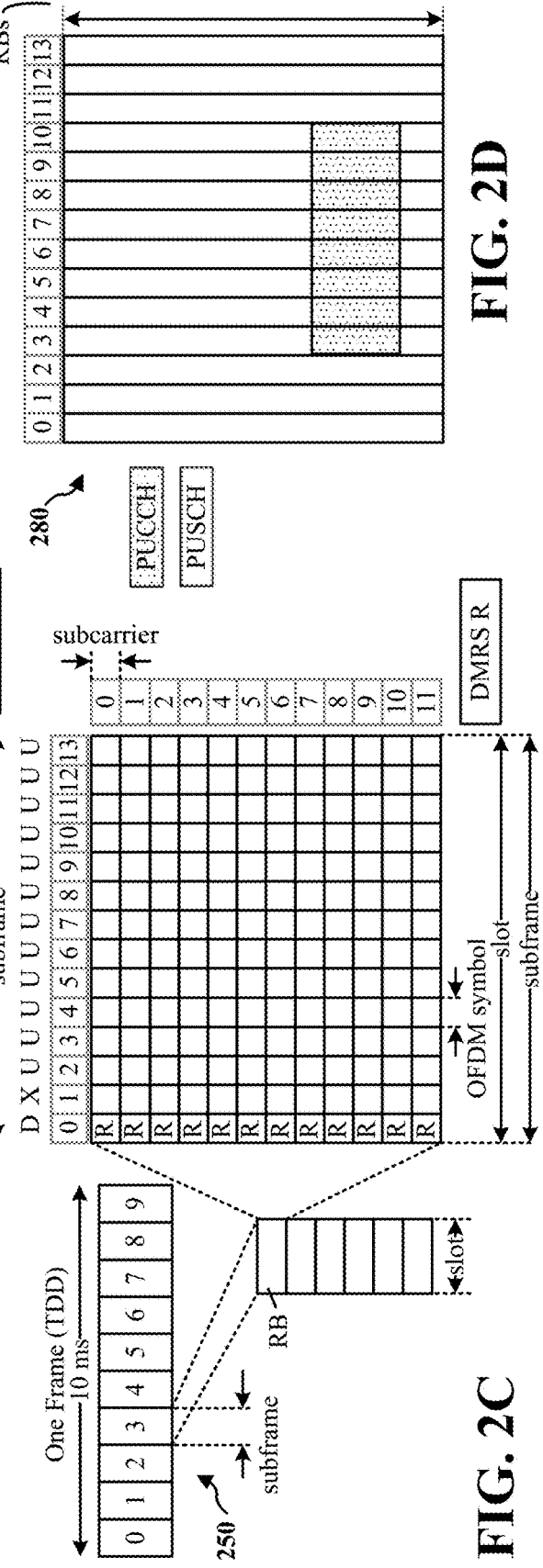

BEAMFORMING CIRCUIT FOR MULTIPLE ANTENNAS

BACKGROUND

The present disclosure relates generally to communication systems, and more particularly, to techniques related to beamforming.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, computer-readable mediums, and apparatuses are provided.

In an aspect, an apparatus for multi-antenna wireless communication includes a first layer 2-dimensional (2D) Butler matrix having first layer input ports and first layer output ports. The apparatus further includes a second layer 2D Butler matrix having second layer input ports and second layer output ports. The apparatus further includes a first layer to second layer switch configurable, based on a control signal applied to a control input pin of the first layer to second layer switch, to selectively connect the first layer output ports of the first layer 2D Butler matrix to at least a subset of the second layer input ports of the second layer 2D Butler matrix.

In another aspect, a method of multi-antenna wireless communication includes selecting one or more input ports of a first layer 2D Butler matrix for communication of one or more streams by an array antenna over one or more beams. The method further includes applying a control signal to a control input pin of a first layer to second layer switch configurable, based on the control signal, to selectively connect first layer output ports of the first layer 2D Butler matrix to at least a subset of second layer input ports of a second layer 2D Butler matrix. The method further includes transmitting or receiving one or more streams by an array antenna over one or more beams, where the array antenna includes a plurality of antenna elements, where each one of the plurality of antenna elements is associated with one output port of the second layer 2D Butler matrix.

In an aspect, an apparatus for wireless communication includes a transceiver, a memory configured to store instructions, and one or more processors communicatively coupled with the transceiver and the memory. The one or more processors are configured to execute the instructions to perform multi-antenna wireless communication including selecting one or more input ports of a first layer 2D Butler matrix for communication of one or more streams by an array antenna over one or more beams; applying a control signal to a control input pin of a first layer to second layer switch configurable, based on the control signal, to selectively connect first layer output ports of the first layer 2D Butler matrix to at least a subset of second layer input ports of a second layer 2D Butler matrix; and transmitting or receiving one or more streams by an array antenna over one or more beams, where the array antenna includes a plurality of antenna elements, where each one of the plurality of antenna elements is associated with one output port of the second layer 2D Butler matrix.

In a further aspect, an apparatus for multi-antenna wireless communication includes means for selecting one or more input ports of a first layer 2D Butler matrix for communication of one or more streams by an array antenna over one or more beams. The apparatus further includes means for applying a control signal to a control input pin of a first layer to second layer switch configurable, based on the control signal, to selectively connect first layer output ports of the first layer 2D Butler matrix to at least a subset of second layer input ports of a second layer 2D Butler matrix. The apparatus further includes means for transmitting or receiving one or more streams by an array antenna over one or more beams, where the array antenna includes a plurality of antenna elements, where each one of the plurality of antenna elements is associated with one output port of the second layer 2D Butler matrix.

In another aspect, a non-transitory computer-readable medium includes code executable by one or more processors to perform multi-antenna wireless communication including selecting one or more input ports of a first layer 2D Butler matrix for communication of one or more streams by an array antenna over one or more beams; applying a control signal to a control input pin of a first layer to second layer switch configurable, based on the control signal, to selectively connect first layer output ports of the first layer 2D Butler matrix to at least a subset of second layer input ports of a second layer 2D Butler matrix; and transmitting or receiving one or more streams by an array antenna over one or more beams, where the array antenna includes a plurality of antenna elements, where each one of the plurality of antenna elements is associated with one output port of the second layer 2D Butler matrix.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
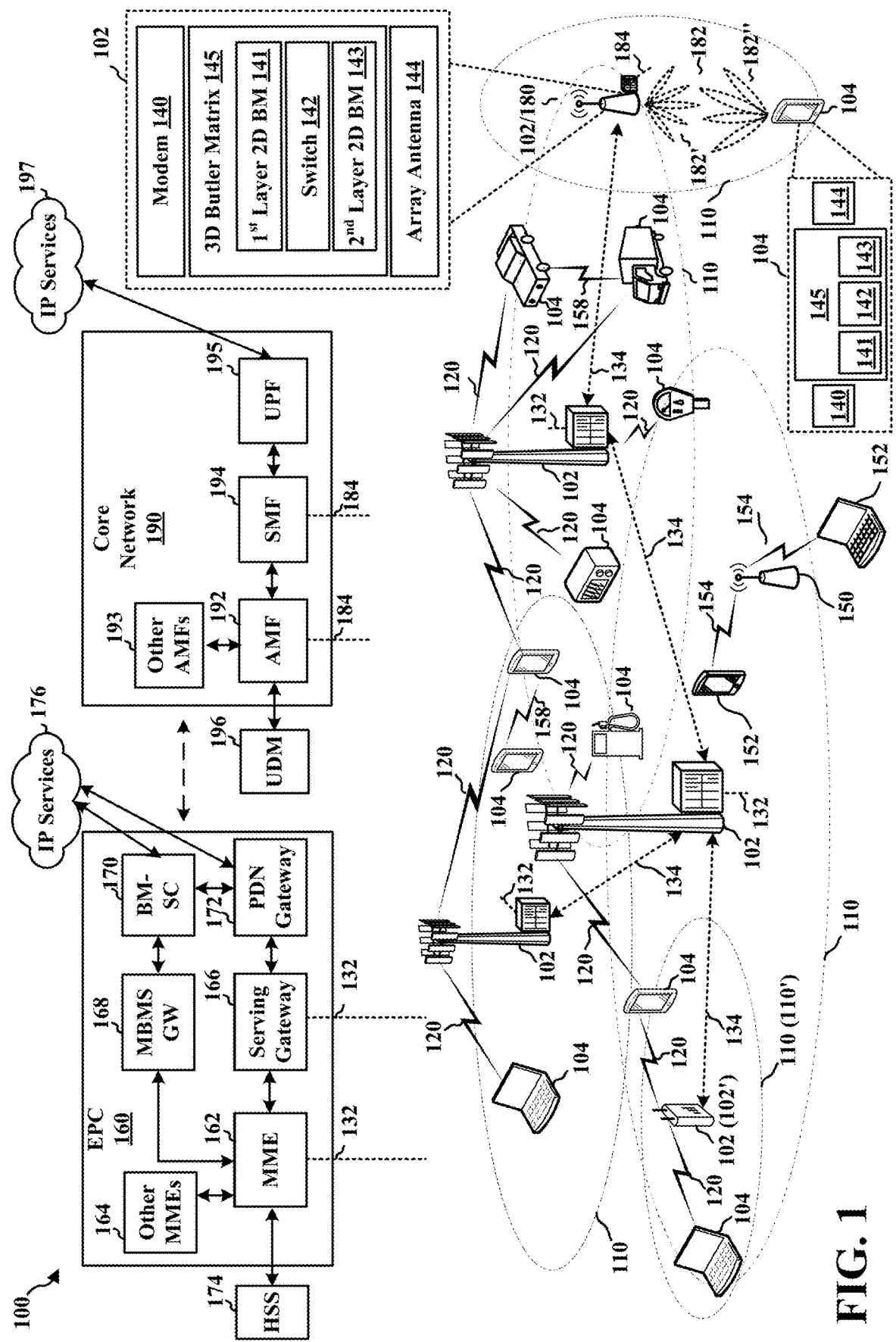
FIG. 1 is a diagram illustrating an example of a wireless communications system and an access network including components for beamforming, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

The present aspects relate to a 3-dimensional (3D) Butler matrix configured for beam steering over an array antenna. The 3D Butler matrix includes a first layer 2-dimensional (2D) Butler matrix, a second layer 2D Butler matrix, and a first layer to second layer switch that selectively connects the first layer 2D Butler matrix to the second layer 2D Butler matrix. More specifically, the first layer to second layer switch is controllable, via a control signal applied to a control input pin of the first layer to second layer switch, to selectively connect the output ports of the first layer 2D Butler matrix to at least a subset of the input ports of the second layer 2D Butler matrix, where each output port of the second layer 2D Butler matrix is associated with one antenna element in a 2D array antenna. In some aspects, each input port of the first layer 2D Butler matrix is associated with a desired beam azimuth or elevation, and each control signal value applied to the control input pin of the first layer to second layer switch is also associated with a desired beam azimuth or elevation. In some aspects, for example, each of the first layer 2D Butler matrix and the second layer 2D Butler matrix may include one or more circuits and/or radio-frequency (RF) components. Further details of the 3D Butler matrix are described below with reference to various aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including UEs 104 and/or base stations 102 configured for beamforming in multi-antenna wireless communication. More specifically, a UE 104 or a base station 102 may include a modem 140 that controls a 3D Butler matrix 145 configured to implement beam steering over a 2D array antenna 144. The 3D Butler matrix 145 includes a first layer 2D Butler matrix 141, a first layer to second layer switch 142, and a second layer 2D Butler matrix 143. The modem 140 controls the first layer to second layer switch 142 (via a control signal applied to a control input pin of the first layer to second layer switch 142) to selectively connect the output ports of the first layer 2D Butler matrix 141 to at least a subset of the input ports of a second layer 2D Butler matrix 143, where each output port of the second layer 2D Butler matrix 143 is associated with one antenna element in the 2D array antenna 144. Further details of the present aspects are described below.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub-6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some aspects, in order to provide higher throughput at lower cost, multiple links may be used per panel (e.g., per area of antennas), where each link is separated from the other links by a different plane wave angle of arrival. These aspects may be applicable, for example, in subTHz communication (e.g., 140 GHz or 300 GHz) where the relatively low wavelengths allow for using relatively smaller antennas and relatively smaller distances between antennas, which allows for having more number of antennas and supporting more links with narrower beams and higher spatial separation between the beams, which allows for better spectral efficiency. In one non-limiting aspect, for example, all links associated with a panel may be configured to have orthogonal patterns. In one implementation, such links may be provided using a Butler matrix which is a beamformer circuit configured to feed an array antenna with a uniform distribution and constant phase difference between adjacent antenna elements.

In an aspect, a Butler matrix may be realized using interconnected phase shifters and hybrid couplers. However, the present aspects are not so limited, and a Butler matrix may be realized in alternative aspects using fewer component types (e.g., using only hybrid couplers) or more component types (e.g., using phase shifters, hybrid couplers, and crossover circuits). In an aspect, for example, in order to transmit RF signals over an array antenna, a modem may select one or more ports of a Butler matrix so that the Butler matrix receives one or more signals on those ports and generates output signals with different phases on opposite ports for transmission over a number of antenna elements coupled with the opposite ports. Also, the Butler matrix may provide reciprocity functionality for receiving RF signals. For example, the Butler matrix may receive RF signals with different phases via multiple ports coupled with a number of antenna elements, and then phase-shift and combine them to provide one or more signals on one or more opposite ports selected by a modem for signal reception. In an aspect, each antenna element of the array antenna may be coupled with one port of the Butler matrix, for example, via one or more low noise amplifiers (LNAs), power amplifiers (PAs), etc., to compensate for insertion loss. The phase shifters in a Butler matrix may be active phase shifters (requiring a connection to a power supply) or passive phase shifters (not requiring a connection to a power supply). In one non-limiting aspect, for example, a phase shifter in a Butler matrix may be realized using a delay line.

In an aspect, a modem and/or another component of a wireless communication device may control a Butler matrix and/or other associated components (e.g., control a gain of an amplifier connecting an output port of the Butler matrix with an antenna element), to form a desired beam for transmitting an RF signal and/or to receive an RF signal over a desired beam. In an aspect, for example, a modem and/or another component of a wireless communication device may control a Butler matrix and/or other associated components to generate multiple signals that are phase-shifted versions of each other, in order to generate a beam by transmission of such signals via multiple antenna elements of an array antenna.

In one non-limiting example aspect, in order to transmit a desired beam, a Butler matrix with a number, N, of input ports and a same number, N, of output ports may allow for feeding an array antenna with a phase difference between adjacent antenna elements in an array antenna with N antenna elements, and each of the N input ports of the Butler matrix may be associated with a different desired beam to be generated by the array antenna. In an aspect, for example, a Butler matrix may be configured to produce a number, N, of orthogonally spaced beams with a plane angle of:

$$\theta_i = \cos^{-1}\left(\frac{\lambda k}{2dN}\right),$$

where $\lambda$ is the wavelength which is equal to the inverse of the carrier frequency, d is the distance between adjacent antennas (which may be, e.g., $\sim=\lambda/2$), and k is:

$k=-N+1:2:N-1$, and such beam configuration is created by adjacent antenna phase difference of:

$$\mp 180 * \frac{2k-1}{N}.$$

In an aspect, for example, $$\frac{N}{2}\log_2 N$$

hybrid couplers and $$\frac{N}{2}(\log_2 N - 1)$$

fixed phase shifters may be used to realize the Butler matrix.

Figure 3:
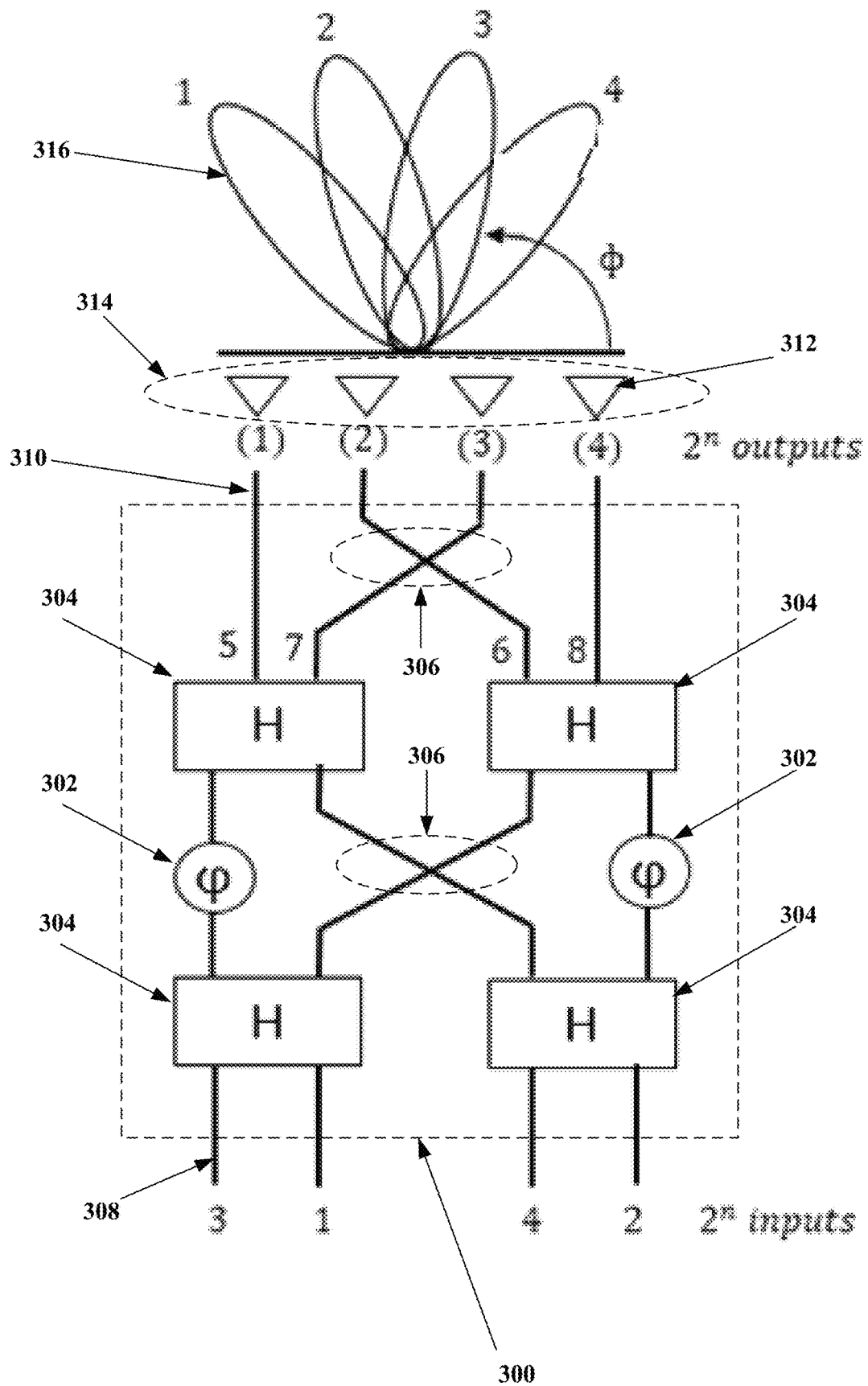
FIG. 3 is a schematic diagram illustrating a first example beamforming circuit, in accordance with various aspects of the present disclosure.

For example, referring to FIG. 3, in one non-limiting aspect, for transmission of a desired beam 316 via multiple antenna elements 312 of an array antenna 314, a 4×4 Butler matrix 300 may be implemented. The 4×4 Butler matrix 300 is a Butler matrix having four input ports 308 and four output ports 310, where each output port 310 is associated with one antenna element 312 in the array antenna 314. Although some of the present aspects are described herein for transmission of a desired beam using a Butler matrix, the present aspects are not so limited, and each aspect may also be used for reception of the desired beam. For example, although FIG. 3 is described herein for transmission of the desired beam 316 using the 4×4 Butler matrix 300, the present aspects are not so limited, and the 4×4 Butler matrix 300 may also be used for reception of the desired beam 316, in which case the 4×4 Butler matrix 300 receives signals on the output ports 310 and then generates a signal on one or more input ports 308.

The example 4×4 Butler matrix 300 includes two 45° phase shifters 302, four 3 dB 90° hybrid couplers 304, and two crossovers 306. Each 45° phase shifter 302 is a two port circuit that receives a signal on one port and outputs a 45° phase shifted version of that signal on the other port. Each 3 dB 90° hybrid coupler 304 is a circuit having two input ports and two output ports. A 3 dB 90° hybrid coupler 304 splits the power of an input signal received on an input port between two output signals generated on the two output ports, and also causes a 90° phase shift between the two output signals generated on the two output ports. Each crossover 306 is a four port circuit in which one conductor (connecting a first input port to a first output port) crosses over another conductor (connecting a second input port to a second output port) with an air gap in between.

The 45° phase shifters 302, 3 dB 90° hybrid couplers 304, and crossovers 306 are configured and arranged such that an activation of an input port 308 of the 4×4 Butler matrix 300 causes an activation of all output ports 310 of the 4×4 Butler matrix 300 but with varying phase shifts relative to each other, such that the interactions of the RF transmissions of the antenna elements 312 fed by the output ports 314 creates a beam 316 corresponding to the activated input port 308. Table 1 provides example phases on each output port 310 of the example 4×4 Butler matrix 300 given an activation of one input port 308 to create a beam 316.

TABLE 1

Example phases on each output port of a 4 × 4 Butler matrix in response to activation of each input port

| | Output state | | | | | | |
|---|---|---|---|---|---|---|---|
| Input port | Port 5 | Port 6 | Port 7 | Port 8 | b | Beam | $\theta_i$ (d = $\lambda$/2) |
| 1 | 1 ∠ 45° | 1 ∠ −180° | 1 ∠ −45° | 1 ∠ 90° | +135° | 1 | 138.6° |
| 2 | 1 ∠ 0° | 1 ∠ 45° | 1 ∠ 90° | 1 ∠ 135° | +45° | 2 | 104.5° |

TABLE 1-continued

Example phases on each output port of a 4 × 4 Butler matrix in response to activation of each input port

| Input port | Output state | | | | b | Beam | $\theta_i$ (d = $\lambda$/2) |
|---|---|---|---|---|---|---|---|
| | Port 5 | Port 6 | Port 7 | Port 8 | | | |
| 3 | 1 ∠ 135° | 1 ∠ 90° | 1 ∠ 45° | 1 ∠ 0° | −45° | 3 | 75.5° |
| 4 | 1 ∠ 90° | 1 ∠ −45° | 1 ∠ −180° | 1 ∠ 45° | −135° | 4 | 41.4° |

Accordingly, a Butler matrix may be implemented to provide a passive feeding N×N network (N input ports and N output ports) with beam steering capabilities for unified array antennas (URAs), where the N output ports of the Butler matrix are connected to respective antenna elements and the N input ports of the Butler matrix represent N orthogonal beam ports. As compared to using N phased arrays for beamforming, a Butler matrix may have lower power consumption, complexity, and/or cost. Further, an N×N Butler matrix may be designed, duplicated, concatenated, etc., to realize a 3D Butler matrix connected to an N×N URA to create N×N beam orthogonal plane waves.

In one non-limiting aspect, for example, a number of Butler matrices each having $2^n$ input ports and $2^n$ output ports may be configured and arranged to realize a 3D Butler matrix connected to a URA having $2^n \times 2^n$ antenna elements to create $2^n \times 2^n$ beam orthogonal plane waves. For example, referring to FIG. 4, in one non-limiting example aspect, a 3D Butler matrix 400 with 16 input ports and 16 output ports may be configured to provide passive feeding for a 4×4 array antenna 402 having 16 antenna elements 403 arranged in four rows where each row includes four antenna elements 403. That is, although the 4×4 antenna elements 403 are schematically illustrated in one row in FIG. 1, the array antenna 402 is 2D and includes a 4×4 matrix of antenna elements 403.

In this non-limiting example aspect, the 3D Butler matrix 400 includes a first layer 2D Butler matrix 404 with 16 input ports and 16 output ports and a second layer 2D Butler matrix 406 with 16 input ports and 16 output ports, where each one of the first layer 2D Butler matrix 404 and the second layer 2D Butler matrix 406 includes four 4×4 Butler matrices 408. In one non-limiting aspect, each of the 4×4 Butler matrices 408 in the first layer 2D Butler matrix 404 or the second layer 2D Butler matrix 406 may be realized similar to the 4×4 Butler matrix 300 described above with reference to FIG. 3, e.g., using phase shifters and hybrid couplers, such that an activation of an input port of each 4×4 Butler matrix 408 activates all output ports of that 4×4 Butler matrix 408.

In an aspect, the output ports of the first layer 2D Butler matrix 404 are connected to the input ports of the second layer 2D Butler matrix 406 such that the four output ports of each 4×4 Butler matrix 408 in the first layer 2D Butler matrix 404 are connected to four input ports of four different 4×4 Butler matrices 408 in the second layer 2D Butler matrix 406. Accordingly, an activation of an output port of the first layer 2D Butler matrix 404 activates one input port in each 4×4 Butler matrix 408 in the second layer 2D Butler matrix 406, thus activating all output ports of the second layer 2D Butler matrix 406. Therefore, an activation of an output port of the first layer 2D Butler matrix 404 activates all output ports of the second layer 2D Butler matrix 406. Therefore, when an input port of the first layer 2D Butler matrix 404 is activated, all output ports of the second layer 2D Butler matrix 406 are activated, resulting in all antenna elements 403 in the 4×4 array antenna 402 to be activated.

Further, assuming that the 4×4 Butler matrices 408 in the first layer 2D Butler matrix 404 are identical to one another, and that the 4×4 Butler matrices 408 in the second layer 2D Butler matrix 406 are also identical to one another, the output ports of the first layer 2D Butler matrix 404 are connected to the input ports of the second layer 2D Butler matrix 406 such that selection of a 4×4 Butler matrix 408 in the first layer 2D Butler matrix 404 causes selection of a same input port of each of the 4×4 Butler matrices 408 in the second layer 2D Butler matrix 406. For example, in an aspect, selection of the first 4×4 Butler matrix 408 in the first layer 2D Butler matrix 404 causes selection of the first input port of each of the 4×4 Butler matrices 408 in the second layer 2D Butler matrix 406, while selection of the second 4×4 Butler matrix 408 in the first layer 2D Butler matrix 404 causes selection of the second input port of each of the 4×4 Butler matrices 408 in the second layer 2D Butler matrix 406, and so on.

In one non-limiting aspect, different 4×4 Butler matrices 408 in the first layer 2D Butler matrix 404 may be associated with different beam elevations, while different input ports of a 4×4 Butler matrices 408 in the first layer 2D Butler matrix 404 may be associated with different beam azimuths. For example, the four Butler matrices 408 in the first layer 2D Butler matrix 404 may be associated with four different beam elevations, and the four input ports of a 4×4 Butler matrix 408 in the first layer 2D Butler matrix 404 may be associated with four different beam azimuths. For example, in order to achieve a beam with a desired azimuth and a desired elevation, an input port of a Butler matrix 408 in the first layer 2D Butler matrix 404 is activated, where the input port is associated with the desired azimuth, and the Butler matrix 408 is associated with the desired beam elevation.

However, the present aspects are not so limited. For example, in an alternative aspect, different 4×4 Butler matrices 408 in the first layer 2D Butler matrix 404 may be associated with different beam azimuths, while different input ports of a 4×4 Butler matrix 408 in the first layer 2D Butler matrix 404 may be associated with different beam elevations. In this case, in order to achieve a beam with a desired azimuth and a desired elevation, an input port of a Butler matrix 408 in the first layer 2D Butler matrix 404 is activated, where the input port is associated with the desired elevation, and the Butler matrix 408 is associated with the desired beam azimuth.

Figure 5:
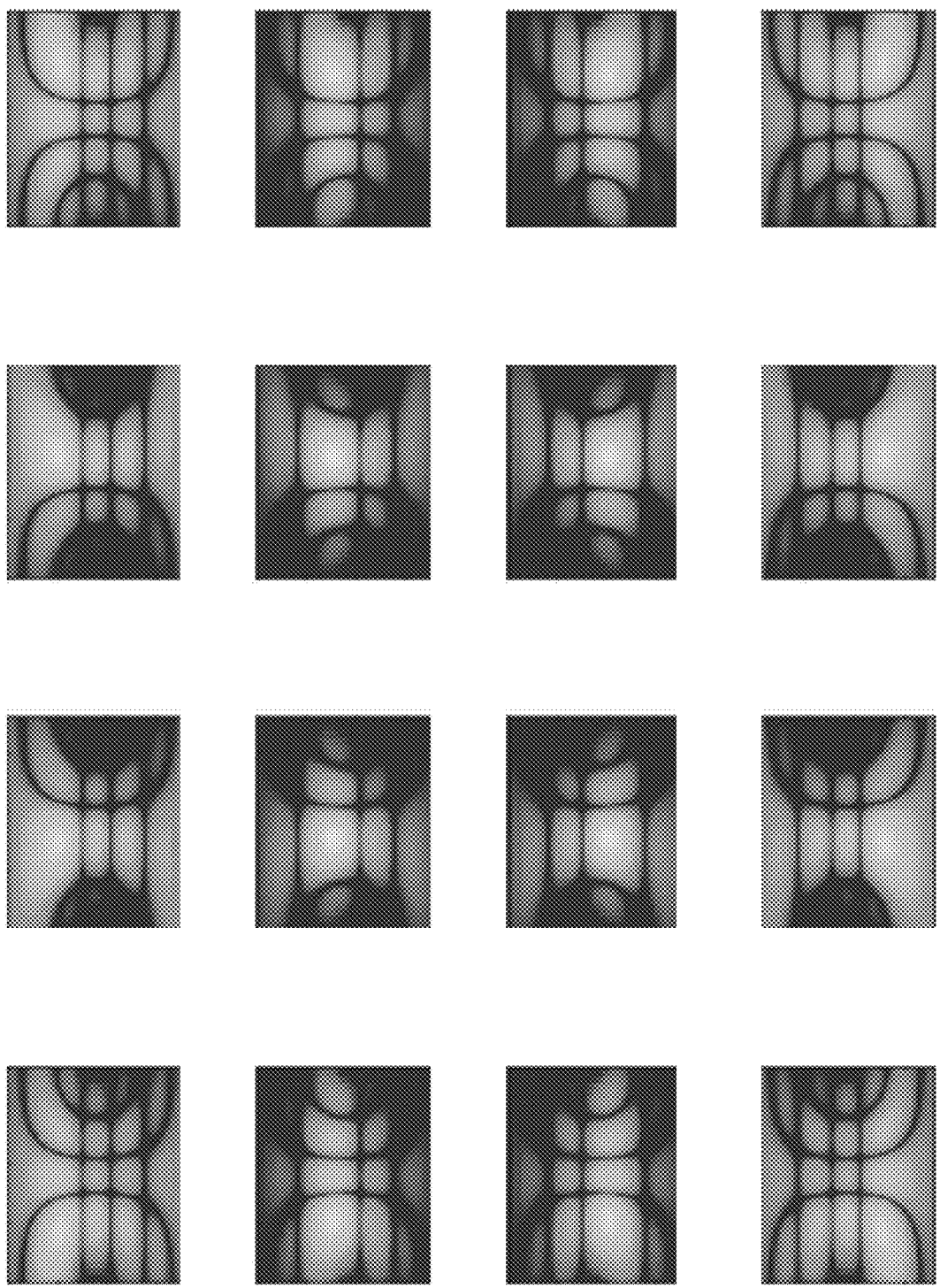
FIG. 5 is a diagram illustrating example beam patterns generated by an array antenna in response to the activation of the input ports in the second example beamforming circuit of FIG. 4, in accordance with various aspects of the present disclosure.

In one non-limiting aspect, for example, activation of the 4×4 array antenna 402 in response to activation of each of the 16 input ports of the first layer 2D Butler matrix 404 provides a 2D pattern of beams 500 as in FIG. 5, where each beam corresponds to an activation of one input port of the first layer 2D Butler matrix 404.

Figure 4:
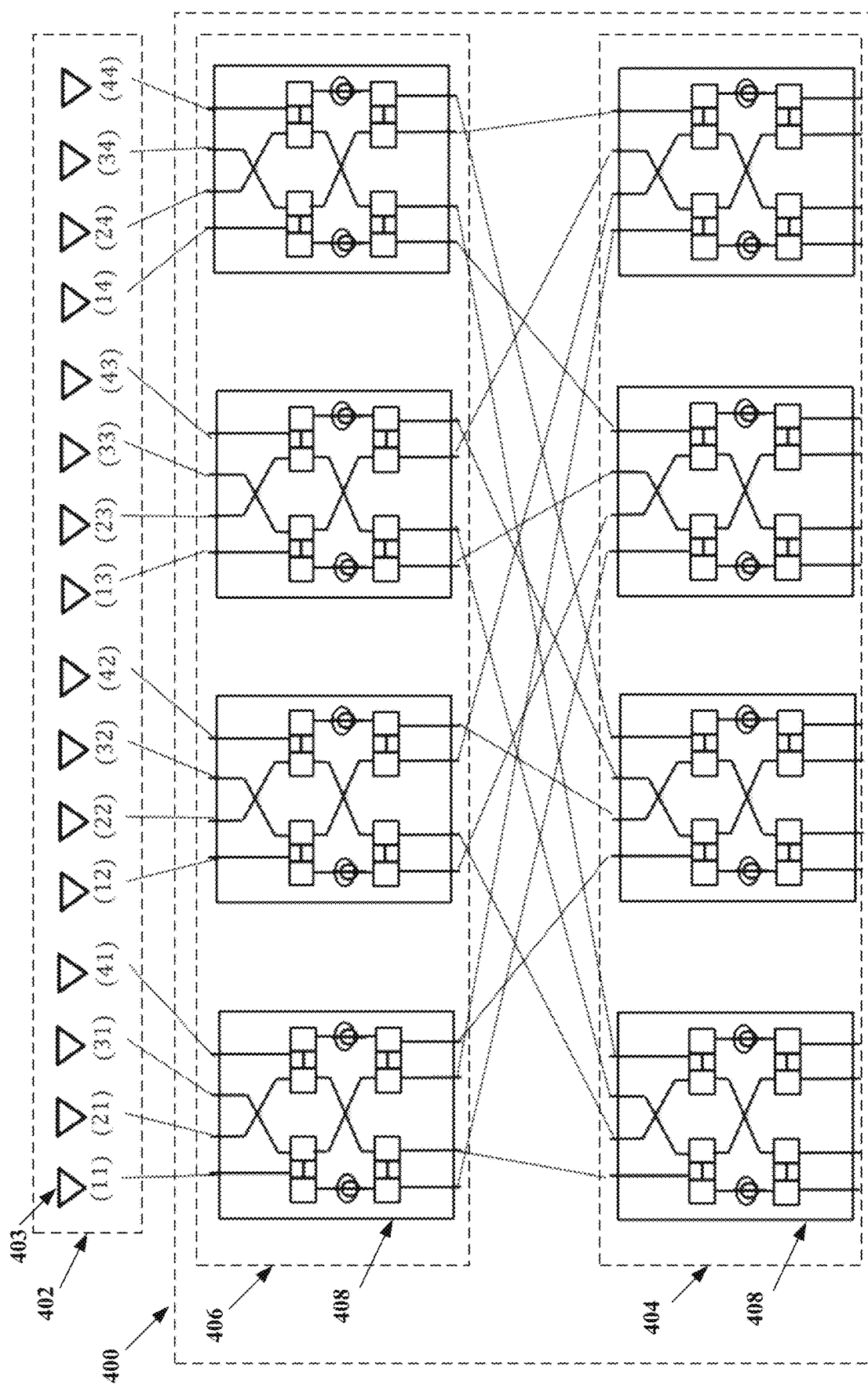
FIG. 4 is a schematic diagram illustrating a second example beamforming circuit, in accordance with various aspects of the present disclosure.

Although the 4×4 array antenna 402 in FIG. 4 is symmetrical, the present aspects are not so limited. For example, a 3D Butler matrix may be configured to feed an array antenna of size A×B where A is different than B. For example, to feed an A×B array antenna, a 3D Butler matrix may include a second layer 2D Butler matrix that has B number of A×A Butler matrices (B number of Butler matrices each having A input ports and A output ports).

Figure 6:
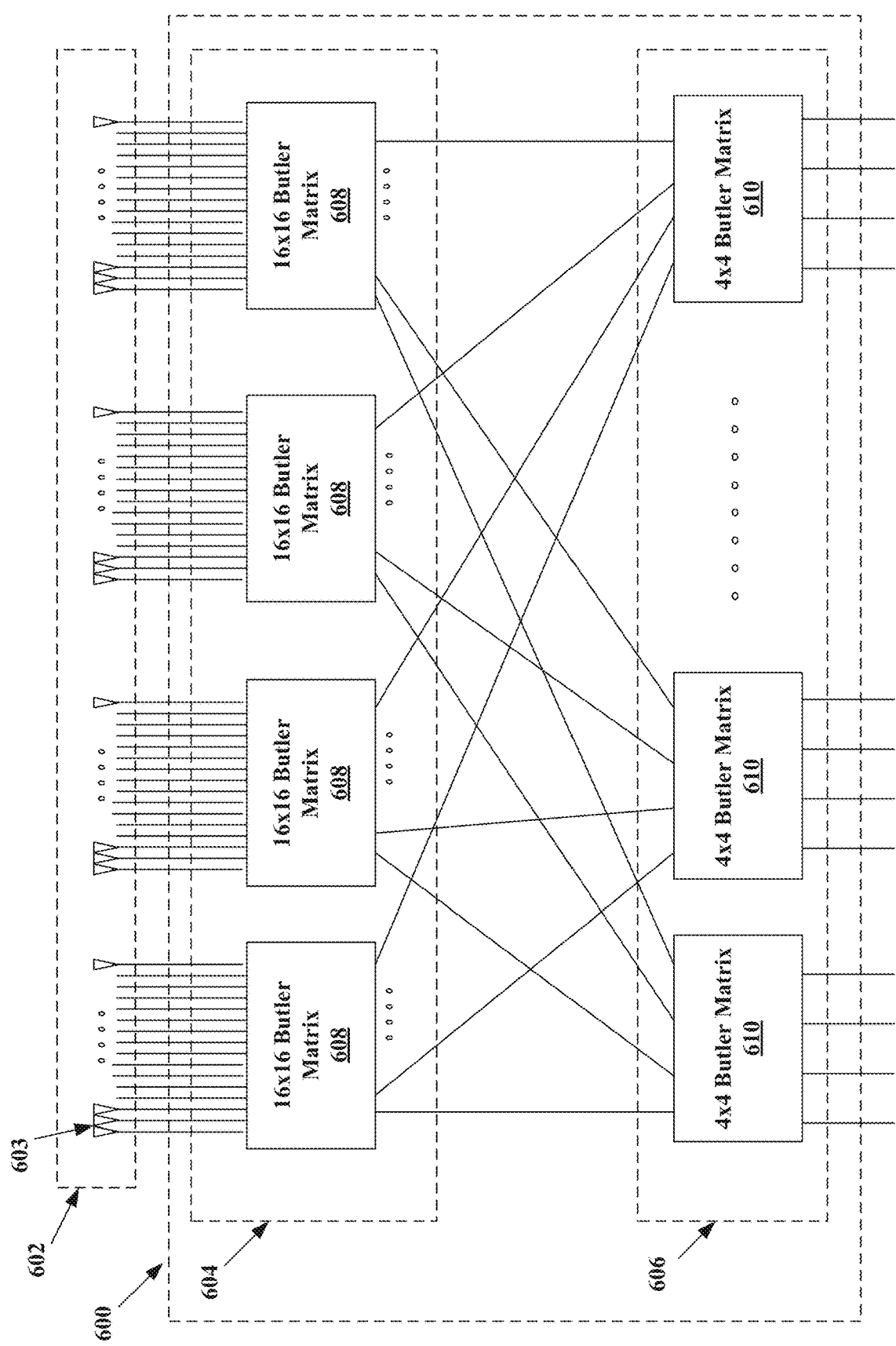
FIG. 6 is a schematic diagram illustrating a third example beamforming circuit, in accordance with various aspects of the present disclosure.

For example, referring to FIG. 6, in one non-limiting aspect, in order to feed a 16×4 URA 602 (e.g., a URA having 4 rows of antenna elements 603, with 16 antenna elements 603 in each row), a 3D Butler matrix 600 with 16×4 output ports may be implemented. In one aspect, for example, the 3D Butler matrix 600 may include a second layer 2D Butler matrix 604 having four 16×16 Butler matrices 608 (four Butler matrices each having 16 input port and 16 output ports), and a first layer 2D Butler matrix 606 having sixteen 4×4 Butler matrices 610 (sixteen Butler matrices each having 4 input port and 4 output ports). However, the present aspects are not so limited. For example, in yet another alternative aspect, a 16×4 URA may be fed by a 3D Butler matrix that includes a first layer 2D Butler matrix having four 16×16 Butler matrices (four Butler matrices each having 16 input port and 16 output ports), and a second layer 2D Butler matrix having sixteen 4×4 Butler matrices (sixteen Butler matrices each having 4 input port and 4 output ports).

Figure 7:
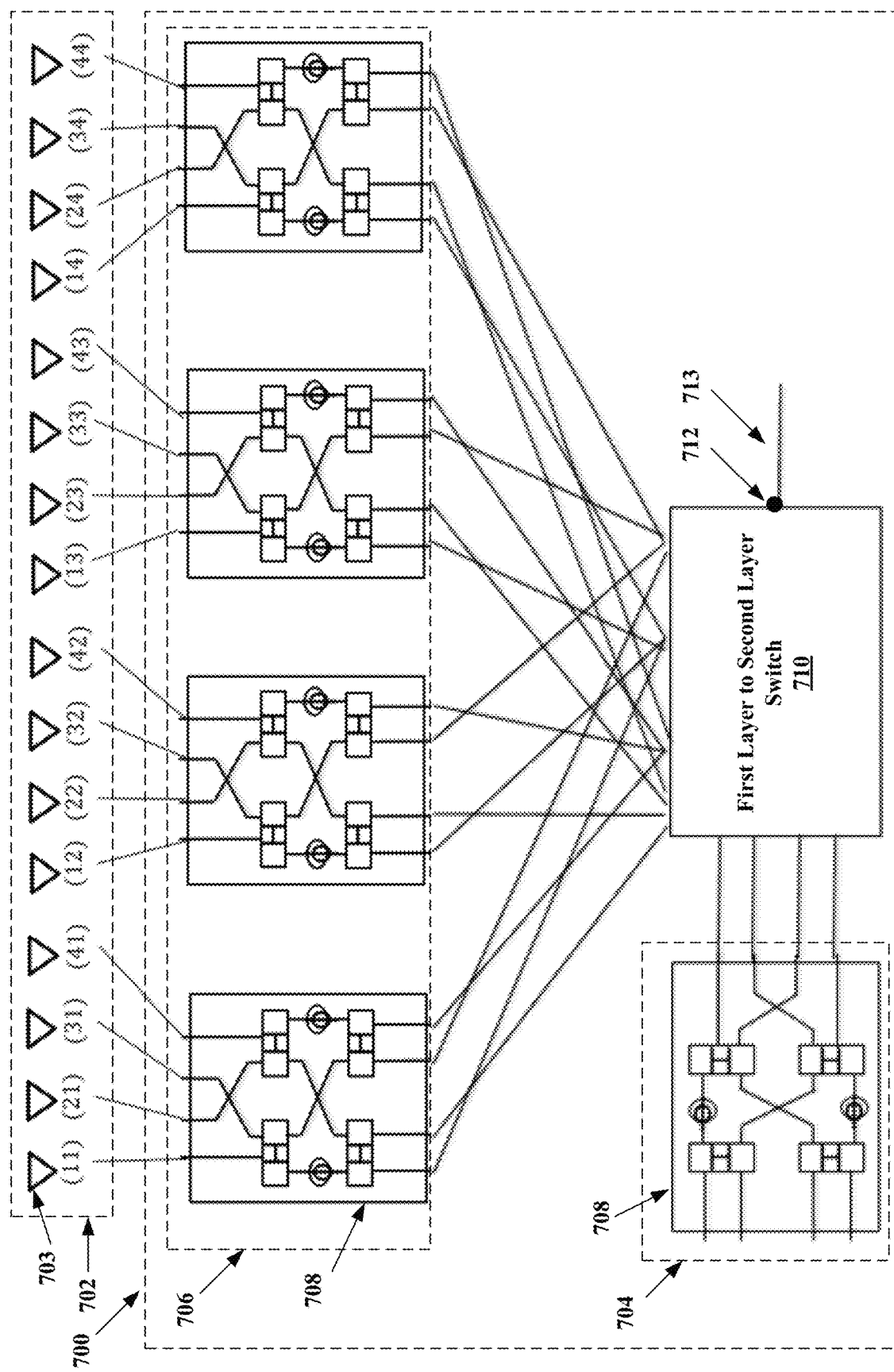
FIG. 7 is a schematic diagram illustrating a fourth example beamforming circuit, in accordance with various aspects of the present disclosure.

Referring to FIG. 7, in an alternative non-limiting example aspect, a first layer to second layer switch 710 may be used to realize a 3D Butler matrix 700 that includes fewer 4×4 Butler matrices 708 as compared to the 3D Butler matrix 400 (FIG. 4), but provides the same beam steering functionality as the 3D Butler matrix 400. That is, the 3D Butler matrix 700 also has 16 output ports and generates the same output signals as the 3D Butler matrix 400, so that the 16 output ports provide passive feeding for a 4×4 array antenna 702. Accordingly, due to using fewer 4×4 Butler matrices 708 as compared to the 3D Butler matrix 400, the 3D Butler matrix 700 may provide the same beamforming functionality and the same beam angles but with reduced cost, size, and/or complexity than the 3D Butler matrix 400.

In one non-limiting example aspect, the 3D Butler matrix 700 includes a first layer 2D Butler matrix 704 with 4 input ports and 4 output ports and a second layer 2D Butler matrix 706 with 16 input ports and 16 output ports. The first layer 2D Butler matrix 704 includes only one 4×4 Butler matrix 708, while the second layer 2D Butler matrix 706 includes four 4×4 Butler matrices 708. Again, each of the 4×4 Butler matrices 708 in the 3D Butler matrix 700 may be realized similar to the 4×4 Butler matrix 300 described above with reference to FIG. 3 (e.g., using phase shifters and hybrid couplers) such that an activation of an input port of a 4×4 Butler matrix 708 activates all output ports of that 4×4 Butler matrix 708.

In an aspect, the first layer to second layer switch 710 is controllable, via a control signal 713 applied to a control input pin 712 of the first layer to second layer switch 710, to selectively connect the output ports of the first layer 2D Butler matrix 704 to at least a subset of the input ports of the second layer 2D Butler matrix 706 such that, at any given time, each output port of the 4×4 Butler matrix 708 in the first layer 2D Butler matrix 704 is connected to one selected input port in each 4×4 Butler matrix 708 in the second layer 2D Butler matrix 706. Accordingly, when an input port of the first layer 2D Butler matrix 704 is activated, all output ports of the second layer 2D Butler matrix 706 are activated, resulting in all antenna elements 703 in the 4×4 array antenna 702 to be activated.

In one aspect, assuming that the 4×4 Butler matrices 708 in the second layer 2D Butler matrix 706 are identical to one another, the first layer to second layer switch 702 is controllable to select a same input port of each of the 4×4 Butler matrices 708 in the second layer 2D Butler matrix 706 to be connected to one of the four output ports of the first layer 2D Butler matrix 704. More specifically, for example, in an aspect, the first layer to second layer switch 710 may be configured such that applying a first signal value to the control input 712 of the first layer to second layer switch 710 selects the first input port of each of the 4×4 Butler matrices 708 in the second layer 2D Butler matrix 706 for connection to a respective output port of the first layer 2D Butler matrix 704, while applying a second signal value to the control input 712 of the first layer to second layer switch 710 selects the second input port of each of the 4×4 Butler matrices 708 in the second layer 2D Butler matrix 706 for connection to a respective output port of the first layer 2D Butler matrix 704, and so on.

More specifically, for example, in an aspect, the first layer to second layer switch 710 may be configured such that applying a first signal value to the control input 712 of the first layer to second layer switch 710 connects the first, second, third, and fourth output port of the first layer 2D Butler matrix 704 to the first input port of the first, second, third, and fourth Butler matrix 708 in the second layer 2D Butler matrix 706, respectively. Also, applying a second signal value to the control input 712 of the first layer to second layer switch 710 connects the first, second, third, and fourth output port of the first layer 2D Butler matrix 704 to the second input port of the first, second, third, and fourth Butler matrix 708 in the second layer 2D Butler matrix 706, respectively, and so on.

More specifically, applying the first signal value to the control input 712 of the first layer to second layer switch 710 causes the first layer to second layer switch 710 to connect the first output port of the first layer 2D Butler matrix 704 to the first input port of the first 4×4 Butler matrix 708 in the second layer 2D Butler matrix 706, connect the second output port of the first layer 2D Butler matrix 704 to the first input port of the second 4×4 Butler matrix 708 in the second layer 2D Butler matrix 706, and so on. Also, for example, applying the second signal value to the control input 708 of the first layer to second layer switch 708 causes the first layer to second layer switch 708 to connect the first output port of the first layer 2D Butler matrix 704 to the second input port of the first 4×4 Butler matrix 708 in the second layer 2D Butler matrix 706, connect the second output port of the first layer 2D Butler matrix 704 to the second input port of the second 4×4 Butler matrix 708 in the second layer 2D Butler matrix 706, and so on.

In one non-limiting aspect, different signal values applied to the control input 712 of the first layer to second layer switch 710 may be associated with different beam elevations, while different input ports of the 4×4 Butler matrix 708 in the first layer 2D Butler matrix 704 may be associated with different beam azimuths. For example, four different signal values applied to the control input 712 of the first layer to second layer switch 710 may be associated with four different beam elevations, and the four input ports of the 4×4 Butler matrix 708 in the first layer 2D Butler matrix 704 may be associated with four different beam azimuths. For example, in order to achieve a beam with a desired azimuth and a desired elevation, an input port of the Butler matrix 708 in the first layer 2D Butler matrix 704 is activated, where the input port is associated with the desired azimuth, and a signal value associated with the desired beam elevation is applied to the control input 712 of the first layer to second layer switch 710.

However, the present aspects are not so limited. For example, in an alternative aspect, different signal values applied to the control input 712 of the first layer to second layer switch 710 may be associated with different beam azimuths, while different input ports of the 4×4 Butler matrix 708 in the first layer 2D Butler matrix 704 may be associated with different beam elevations. For example, four different signal values applied to the control input 712 of the first layer to second layer switch 710 may be associated with four different beam azimuths, and the four input ports of the 4×4 Butler matrix 708 in the first layer 2D Butler matrix 704 may be associated with four different beam elevations. For example, in order to achieve a beam with a desired azimuth and a desired elevation, an input port of the Butler matrix 708 in the first layer 2D Butler matrix 704 is activated, where the input port is associated with the desired elevation, and a signal value associated with the desired beam azimuth is applied to the control input 712 of the first layer to second layer switch 710.

By using the first layer to second layer switch 710, the 3D Butler matrix 700 may provide the same beamforming functionality as the 3D Butler matrix 400 (FIG. 4) but with fewer total number of 4×4 Butler matrices 708, which may reduce cost, size, and/or complexity, for example, in high dimension multi-antenna communication.

In an aspect, the 3D Butler matrix 700 may be used to support multiple links, for example, by activating more than one input port of the first layer 2D Butler matrix 704 corresponding to multiple different azimuths. The multiple links may correspond to multiple beams on one dimension (azimuth or elevation) to avoid undesired beams. For example, in one example aspect, two links may be used by activating two input port of the 4×4 Butler matrix 708 in the first layer 2D Butler matrix 704, where the two input ports are associated with two different azimuths. Alternatively, in some aspects, the first layer 2D Butler matrix 704 may include two 4×4 Butler matrices where each 4×4 Butler matrix supports one stream. In this case, the 3D Butler matrix 700 may be used to support two links by activating one input port of each of the two 4×4 Butler matrices 708 in the first layer 2D Butler matrix 704.

In an aspect, the first layer to second layer switch 710 maintains reciprocity so that the 3D Butler matrix 700 may support both uplink and downlink communication.

Figure 8:
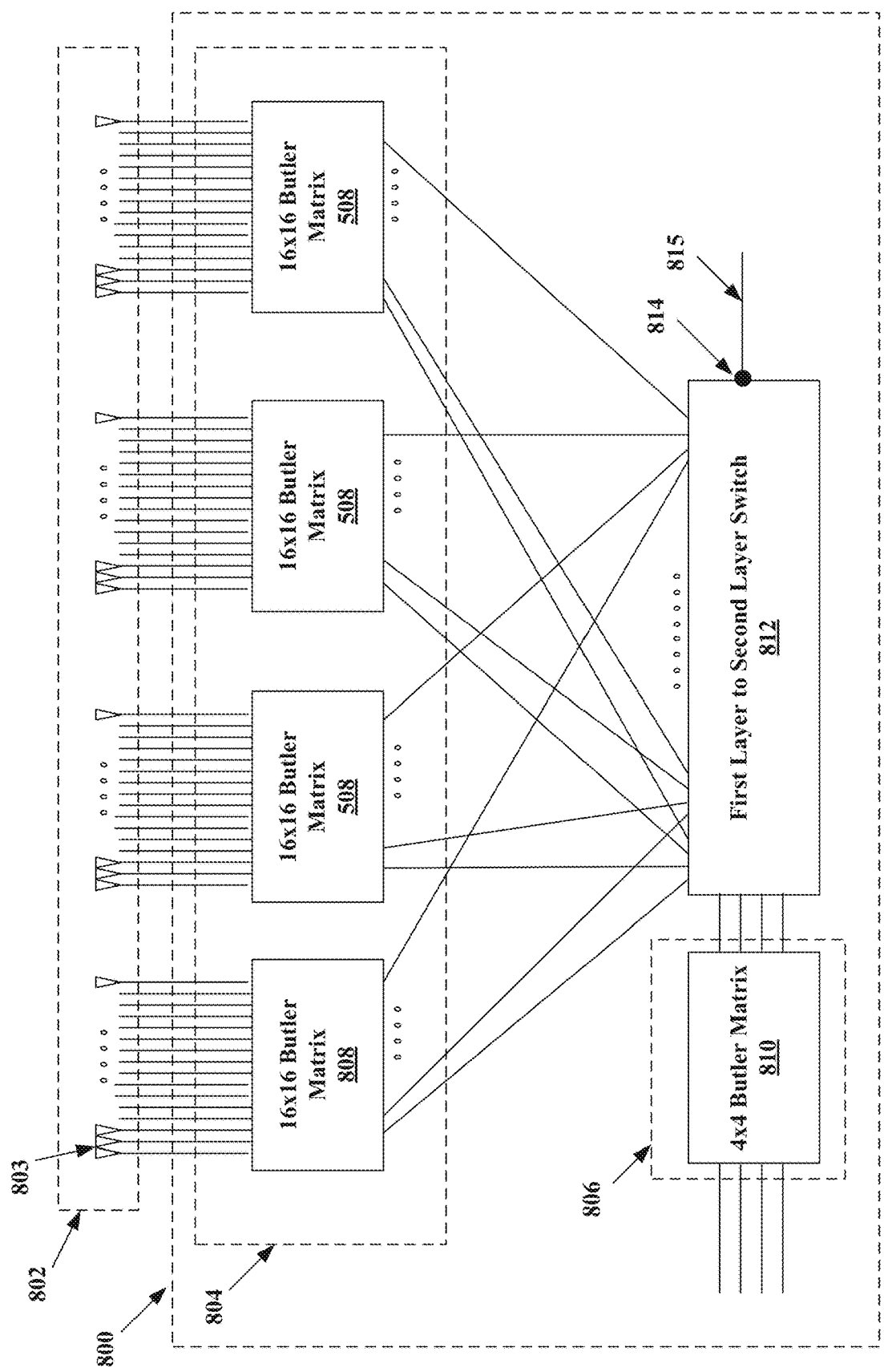
FIG. 8 is a schematic diagram illustrating a fifth example beamforming circuit, in accordance with various aspects of the present disclosure.

Although the first layer to second layer switch 710 is used in FIG. 7 to reduce the number of 4×4 Butler matrices 708 in the 3D Butler matrix 700 as compared to the 3D Butler matrix 400 in FIG. 4, the present aspects are not so limited. For example, referring to FIG. 8, in another non-limiting aspect, a first layer to second layer switch 812 with 4 inputs and 16×4 outputs may be configurable via a control signal applied to a control input pin 814 to realize a 3D Butler matrix 800 that has only one 4×4 Butler matrix 810 in a first layer 2D Butler matrix 806 but can otherwise provide the same beam outputs as the 3D Butler matrix 600 in FIG. 6. Specifically, a 16×4 URA 802 having four rows that each include 16 antenna elements 803 may be fed by the output ports of a second layer 2D Butler matrix 804 of the 3D Butler matrix 800. Similar to the 3D Butler matrix 600 in FIG. 6, the second layer 2D Butler matrix 804 of the 3D Butler matrix 800 includes four 16×16 Butler matrices 808 (four Butler matrices each having 16 input port and 16 output ports). However, by using the first layer to second layer switch 812, the 3D Butler matrix 800 may provide the same beamforming functionality as the 3D Butler matrix 600 (FIG. 6) but with only one 4×4 Butler matrix 810 in the first layer 2D Butler matrix 806, which may reduce cost, size, and/or complexity.

In an aspect, the first layer to second layer switch 812 is controllable, via a control signal 815 applied to a control input pin 814 of the first layer to second layer switch 812, to selectively connect the output ports of the first layer 2D Butler matrix 806 to at least a subset of the input ports of the second layer 2D Butler matrix 804. In one non-limiting aspect, for example, different signal values applied to the control input pin 814 of the first layer to second layer switch 812 may be associated with different beam elevations, while different input ports of the 4×4 Butler matrix 810 in the first layer 2D Butler matrix 806 may be associated with different beam azimuths. For example, 16 different signal values may be applied to the control input 814 of the first layer to second layer switch 812 to select 16 different beam elevations, and the four input ports of the 4×4 Butler matrix 810 in the first layer 2D Butler matrix 806 may be associated with four different beam azimuths. For example, in order to achieve a beam with a desired azimuth and a desired elevation, an input port of the Butler matrix 810 in the first layer 2D Butler matrix 806 is activated, where the input port is associated with the desired azimuth, and a signal value associated with the desired beam elevation is applied to the control input pin 814 of the first layer to second layer switch 812.

However, the present aspects are not so limited. For example, in an alternative aspect, different signal values applied to the control input pin 814 of the first layer to second layer switch 812 may be associated with different beam azimuths, while different input ports of the 4×4 Butler matrix 810 in the first layer 2D Butler matrix 806 may be associated with different beam elevations. For example, 16 different signal values may be applied to the control input 814 of the first layer to second layer switch 812 to select 16 different beam azimuths, and the four input ports of the 4×4 Butler matrix 810 in the first layer 2D Butler matrix 806 may be associated with four different beam elevations. For example, in order to achieve a beam with a desired azimuth and a desired elevation, an input port of the Butler matrix 810 in the first layer 2D Butler matrix 806 is activated, where the input port is associated with the desired elevation, and a signal value associated with the desired beam azimuth is applied to the control input 814 of the first layer to second layer switch 708.

In one non-limiting aspect, in response to an activation of an input port of the 4×4 Butler matrix 810 in the first layer 2D Butler matrix 806, the four inputs of the first layer to second layer switch 812 are activated, and only 4 outputs out of the 16×4 outputs of the first layer to second layer switch 812 are activated (enabled).

In one non-limiting aspect, the first layer to second layer switch 812 may be realized using four number of 1×16 switches, where each 1×16 switch has one input and 16 outputs and is controllable (via the control signal 815 applied to the control input pin 814 of the first layer to second layer switch 812) to connect the input to one of the 16 outputs. In one aspect, each of the 1×16 switches is associated with one of the output ports of the 4×4 Butler matrix 810 in the first layer 2D Butler matrix 806 and one of the 16×16 Butler matrices 808 in the second layer 2D Butler matrix 804. More specifically, the input of each of the 1×16 switches is connected to one of the output ports of the 4×4 Butler matrix 810 in the first layer 2D Butler matrix 806, and the 16 outputs of each of the 1×16 switches is connected to the 16 input ports of one of the 16×16 Butler matrices 808 in the second layer 2D Butler matrix 804.

In one non-limiting aspect, for example, each 1×4 switch is controllable (via the control signal 815 applied to the control input pin 814 of the first layer to second layer switch 812) to select one input port of a 16×16 Butler matrix 808 in the second layer 2D Butler matrix 804, where the selected input port of the 16×16 Butler matrix 808 in the second layer 2D Butler matrix 804 corresponds to a desired beam azimuth or elevation. In this aspect, when the four inputs of the first layer to second layer switch 812 are activated, only one output of each 1×16 switch is activated, therefore only 4 outputs out of the 16×4 outputs of the first layer to second layer switch 812 are activated (enabled). Further, the four activated outputs of the first layer to second layer switch 812 are connected to the same input port number in the 16×16 Butler matrices 808 in the second layer 2D Butler matrix 804. That is, when the four inputs of the first layer to second layer switch 812 are activated, a same input port number in each of the 16×16 Butler matrices 808 in the second layer 2D Butler matrix 804 is activated, for example, to choose a desired beam azimuth or elevation.

In an aspect, in order to support more than one stream\link, the first layer 2D Butler matrix 806 may include more than one Butler matrix, where each Butler matrix supports one stream/link. For example, in one non-limiting alternative aspect, the first layer 2D Butler matrix 806 may include two Butler matrices of size 4×4, in which case the first layer to second layer switch 812 will have 8 inputs and 16×4 outputs, and only 8 outputs out of the 16×4 outputs of the first layer to second layer switch are activated (enabled) at any given time.

In yet another alternative aspect, a 3D Butler matrix operable to feed a 16×4 URA may include a first layer 2D Butler matrix having one 16×16 Butler matrix (a Butler matrix having 16 input port and 16 output ports), a second layer 2D Butler matrix having sixteen 4×4 Butler matrices (sixteen Butler matrices each having 4 input port and 4 output ports), and a first layer to second layer switch having 16 inputs and 16×4 outputs and being configurable via a control signal applied to a control input pin to selectively connect the output ports of the first layer 2D Butler matrix to the input ports of the second layer 2D Butler matrix. In one non-limiting aspect, for example, 4 different signal values applied to the control input pin of the first layer to second layer switch 812 may be associated with 4 different beam elevations, while the 16 input ports of the 16×16 Butler matrix in the first layer 2D Butler matrix may be associated with different beam azimuths. In an alternative non-limiting aspect, for example, 4 different signal values applied to the control input of the first layer to second layer switch 812 may be associated with 4 different beam azimuths, while the 16 input ports of the 16×16 Butler matrix in the first layer 2D Butler matrix may be associated with different beam elevations.

In one non-limiting aspect, in response to an activation of an input port of the 16×16 Butler matrix in the first layer 2D Butler matrix, the 16 inputs of the first layer to second layer switch are activated, and only 16 outputs out of the 16×4 outputs of the first layer to second layer switch are activated (enabled).

In one non-limiting aspect, the first layer to second layer switch may be realized using 16 number of 1×4 switches, where each 1×4 switch has one input and 4 outputs and is controllable (via the control signal applied to the control input pin of the first layer to second layer switch) to connect the input to one of the 4 outputs. In one aspect, each of the 1×4 switches is associated with one of the output ports of the 16×16 Butler matrix in the first layer 2D Butler matrix and one of the 4×4 Butler matrices in the second layer 2D Butler matrix. More specifically, the input of each of the 1×4 switches is connected to one of the output ports of the 16×16 Butler matrix in the first layer 2D Butler matrix, and the 4 outputs of each of the 1×4 switches is connected to the 4 input ports of one of the 4×4 Butler matrices in the second layer 2D Butler matrix.

In one non-limiting aspect, for example, each 1×16 switch is controllable (via the control signal applied to the control input pin of the first layer to second layer switch) to select one input port of a 4×4 Butler matrix in the second layer 2D Butler matrix, where the selected input port of the 4×4 Butler matrix in the second layer 2D Butler matrix corresponds to a desired beam azimuth or elevation. In this aspect, when the 16 inputs of the first layer to second layer switch are activated, only one output of each 1×4 switch is activated, therefore only 16 outputs out of the 16×4 outputs of the first layer to second layer switch are activated (enabled). Further, the 16 activated outputs of the first layer to second layer switch are connected to the same input port number in the 4×4 Butler matrices in the second layer 2D Butler matrix. That is, when the 16 inputs of the first layer to second layer switch are activated, a same input port number in each of the 4×4 Butler matrices in the second layer 2D Butler matrix is activated, for example, to choose a desired beam azimuth or elevation.

Although the number of input ports and output ports of each Butler matrix in the above aspects is equal to each other and equal to a power of 2 (e.g., 4 input ports and 4 output ports, 16 input ports and 16 output ports, etc.), the present aspects are not so limited. For example, in some alternative aspects, a 3D Butler matrix may include Butler matrices that each have N input port and M output ports, where N and M are not equal to each other, or where N and/or M is not a power of 2.

In one non-limiting aspect, for example, a 3D Butler matrix may be configured for passive feeding of an N×N array antenna with N rows each including N antenna elements. The 3D Butler matrix may include a first layer 2D Butler matrix having N number of M×M Butler matrices (N>M>=1), a first layer to second layer switch selectively connecting N×M inputs to N×N outputs, and a second layer 2D Butler matrix having N number of N×N Butler matrices. Accordingly, the 3D Butler matrix may allow for N×M different beams having N×M different combinations of azimuth and elevation (e.g., N different azimuth×M different elevations, or M different azimuth×N different elevations). In one aspect, beam activation information may be inserted into the first layer to second layer switch (by a control signal applied to a control input pin of the first layer to second layer switch) to control the input-output connectivity of the first layer to second layer switch. In one non-limiting aspect, for example, a desired beam is chosen from one of N×M different beams, where each different input value to the control input pin of the first layer to second layer switch selects a different elevation, and each input port of the first layer 2D Butler matrix selects a different azimuth.

In yet another non-limiting aspect, for example, a 3D Butler matrix may include a first layer 2D Butler matrix having N number of M×P Butler matrices, a first layer to second layer switch selectively connecting N×P input pins to N×P×Q output pins based on a control signal applied to a control input pin of the first layer to second layer switch, and a second layer 2D Butler matrix having N×P number of Q×T Butler matrices, where N, M, P, Q, and T are positive integer values. Accordingly, the 3D Butler matrix may allow for N×M×Q different beams having N×M×Q different combinations of azimuth and elevation.

Figure 9:
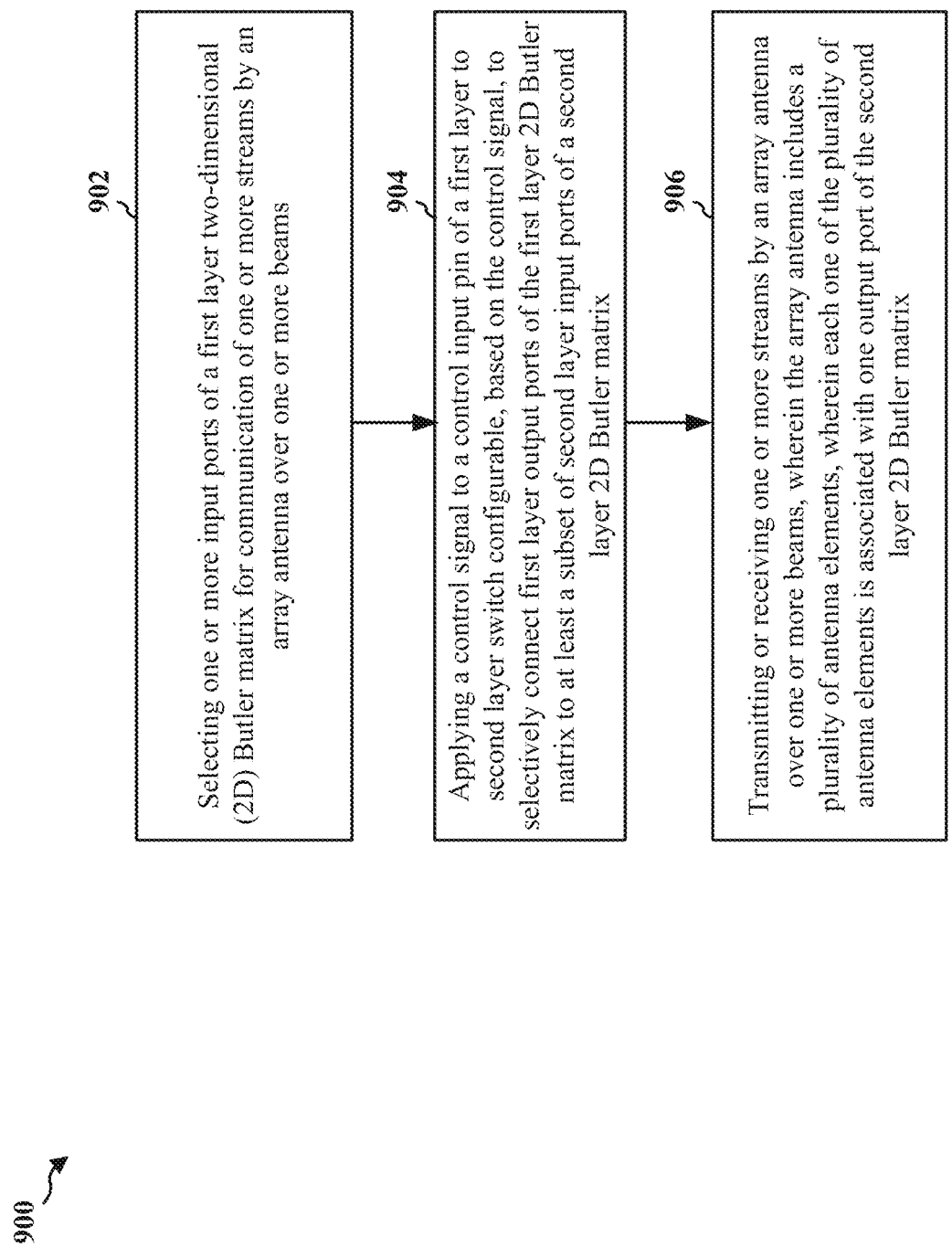
FIG. 9 is a flow chart illustrating an example method for multi-antenna wireless communication, in accordance with various aspects of the present disclosure.

FIG. 9 illustrates a flow chart of an example method 900 for multi-antenna wireless communication. In an aspect, for example, UE 104 may perform the functions described in method 900 using one or more of the components described in FIG. 1 above or in FIGS. 10 and 11 below (e.g., modem 140, 3D Butler matrix 145, array antenna 144, RF front end 1088, transceiver 1002, processor 1012, and/or memory 1016). In another aspect, base station 102 may perform the functions described in method 900 using one or more of the components described in FIG. 1 above or in FIGS. 11 and 12 below (e.g., modem 140, 3D Butler matrix 145, array antenna 144, RF front end 1288, transceiver 1202, processor 1212, and/or memory 1216).

At 902, the method 900 includes selecting one or more input ports of a first layer 2D Butler matrix for communication of one or more streams by an array antenna over one or more beams. For example, in an aspect, UE 104, modem 140, 3D Butler matrix 145, array antenna 144, RF front end 1088, transceiver 1002, processor 1012, and/or memory 1016 may select one or more input ports of a first layer 2D Butler matrix for communication of one or more streams by an array antenna over one or more beams. Accordingly, in an aspect, UE 104, modem 140, 3D Butler matrix 145, array antenna 144, RF front end 1088, transceiver 1002, processor 1012, and/or memory 1016 may provide means for selecting one or more input ports of a first layer 2D Butler matrix for communication of one or more streams by an array antenna over one or more beams. In another aspect, base station 102, modem 140, 3D Butler matrix 145, array antenna 144, RF front end 1288, transceiver 1202, processor 1212, and/or memory 1216 may select one or more input ports of a first layer 2D Butler matrix for communication of one or more streams by an array antenna over one or more beams. Accordingly, in an aspect, base station 102, modem 140, 3D Butler matrix 145, array antenna 144, RF front end 1288, transceiver 1202, processor 1212, and/or memory 1216 may provide means for selecting one or more input ports of a first layer 2D Butler matrix for communication of one or more streams by an array antenna over one or more beams.

For example, in an aspect, referring to FIGS. 1 and 7, a modem 140 of a UE 104 or a base station 102 may select one or more input ports of a first layer 2D Butler matrix 704 for communication of one or more streams by an array antenna 702 over one or more beams. For example, the modem 140 may select input ports that are associated with a desired beam elevation or azimuth such that applying one or more streams to those input ports causes generation of phase shifted versions of the streams on the output ports of the second layer 2D matrix 706 and causes transmission of one or more signals by the antenna elements 703 of the array antenna 702 over beams with the desired azimuth or elevation.

At 904, the method 900 includes applying a control signal to a control input pin of a first layer to second layer switch configurable, based on the control signal, to selectively connect first layer output ports of the first layer 2D Butler matrix to at least a subset of second layer input ports of a second layer 2D Butler matrix. For example, in an aspect, UE 104, modem 140, 3D Butler matrix 145, array antenna 144, RF front end 1088, transceiver 1002, processor 1012, and/or memory 1016 may apply a control signal to a control input pin of a first layer to second layer switch configurable, based on the control signal, to selectively connect first layer output ports of the first layer 2D Butler matrix to at least a subset of second layer input ports of a second layer 2D Butler matrix. Accordingly, in an aspect, UE 104, modem 140, 3D Butler matrix 145, array antenna 144, RF front end 1088, transceiver 1002, processor 1012, and/or memory 1016 may provide means for applying a control signal to a control input pin of a first layer to second layer switch configurable, based on the control signal, to selectively connect first layer output ports of the first layer 2D Butler matrix to at least a subset of second layer input ports of a second layer 2D Butler matrix. In another aspect, base station 102, modem 140, 3D Butler matrix 145, array antenna 144, RF front end 1288, transceiver 1202, processor 1212, and/or memory 1216 may apply a control signal to a control input pin of a first layer to second layer switch configurable, based on the control signal, to selectively connect first layer output ports of the first layer 2D Butler matrix to at least a subset of second layer input ports of a second layer 2D Butler matrix. Accordingly, in an aspect, base station 102, modem 140, 3D Butler matrix 145, array antenna 144, RF front end 1288, transceiver 1202, processor 1212, and/or memory 1216 may provide means for applying a control signal to a control input pin of a first layer to second layer switch configurable, based on the control signal, to selectively connect first layer output ports of the first layer 2D Butler matrix to at least a subset of second layer input ports of a second layer 2D Butler matrix.

For example, in an aspect, referring to FIGS. 1 and 7, a modem 140 of a UE 104 or a base station 102 may apply a control signal 713 to a control input pin 712 of a first layer to second layer switch 710 so that the first layer to second layer switch 710 selectively connects output ports of the first layer 2D Butler matrix 704 to at least a subset of the input ports of a second layer 2D Butler matrix 706 to generate a beam with a desired azimuth or elevation in response to a stream applied to an input port of the first layer 2D Butler matrix 704. For example, a modem 140 of a UE 104 or a base station 102 may apply a control signal 712 that is associated with a desired beam elevation or azimuth to control the connectivity of the first layer to second layer switch 710 such that applying one or more streams to an input port of the first layer 2D Butler matrix 704 causes generation of phase shifted versions of the streams on the output ports of the second layer 2D matrix 706 and causes transmission of one or more signals by the antenna elements 703 of the array antenna 702 over beams with the desired azimuth or elevation.

At 906, the method 900 includes transmitting or receiving one or more streams by an array antenna over one or more beams, where the array antenna includes a plurality of antenna elements, where each one of the plurality of antenna elements is associated with one output port of the second layer 2D Butler matrix. For example, in an aspect, UE 104, modem 140, 3D Butler matrix 145, array antenna 144, RF front end 1088, transceiver 1002, processor 1012, and/or memory 1016 may transmit or receive one or more streams by an array antenna over one or more beams, where the array antenna includes a plurality of antenna elements, where each one of the plurality of antenna elements is associated with one output port of the second layer 2D Butler matrix. Accordingly, in an aspect, UE 104, modem 140, 3D Butler matrix 145, array antenna 144, RF front end 1088, transceiver 1002, processor 1012, and/or memory 1016 may provide means for transmitting or receiving one or more streams by an array antenna over one or more beams, where the array antenna includes a plurality of antenna elements, where each one of the plurality of antenna elements is associated with one output port of the second layer 2D Butler matrix. In another aspect, base station 102, modem 140, 3D Butler matrix 145, array antenna 144, RF front end 1288, transceiver 1202, processor 1212, and/or memory 1216 may transmit or receive one or more streams by an array antenna over one or more beams, where the array antenna includes a plurality of antenna elements, where each one of the plurality of antenna elements is associated with one output port of the second layer 2D Butler matrix. Accordingly, in an aspect, base station 102, modem 140, 3D Butler matrix 145, array antenna 144, RF front end 1288, transceiver 1202, processor 1212, and/or memory 1216 may provide means for transmitting or receiving one or more streams by an array antenna over one or more beams, where the array antenna includes a plurality of antenna elements, where each one of the plurality of antenna elements is associated with one output port of the second layer 2D Butler matrix.

For example, in an aspect, referring to FIGS. 1 and 7, a UE 104 or a base station 102 may transmit or receive one or more streams by the array antenna 702 over one or more beams, where the array antenna 702 includes a plurality of antenna elements 703, and each one of the plurality of antenna elements 703 is associated with one output port of the second layer 2D Butler matrix 706.

For example, in one non-limiting example aspect, in order to transmit a stream over a beam with a desired azimuth and a desired elevation, the modem 140 may select an input port of the first layer Butler matrix 704, where the input port is associated with the desired beam azimuth. The modem 140 may also apply a control signal 713 to the control input pin 712 of the first layer to second layer switch 710, where the control signal 713 is associated with the desired beam elevation. Selection of the input port associated with the desired beam azimuth and selection of the control signal 713 associated with the beam elevation causes the 3D Butler matrix 700 to generate signals on the output ports of the second layer Butler matrix 706 that have relative phase shifts with respect to each other that cause the array antenna 702 to generate a beam with the desired azimuth and elevation. The 3D Butler matrix 700 also provides reciprocity functionality. That is, the same selections made by the modem 140 for transmission of a stream over a beam with a desired azimuth and a desired elevation would also cause the 3D Butler matrix 700 to operate in a reception mode to receive a stream over a beam with the desired azimuth and the desired elevation.

Figure 10:
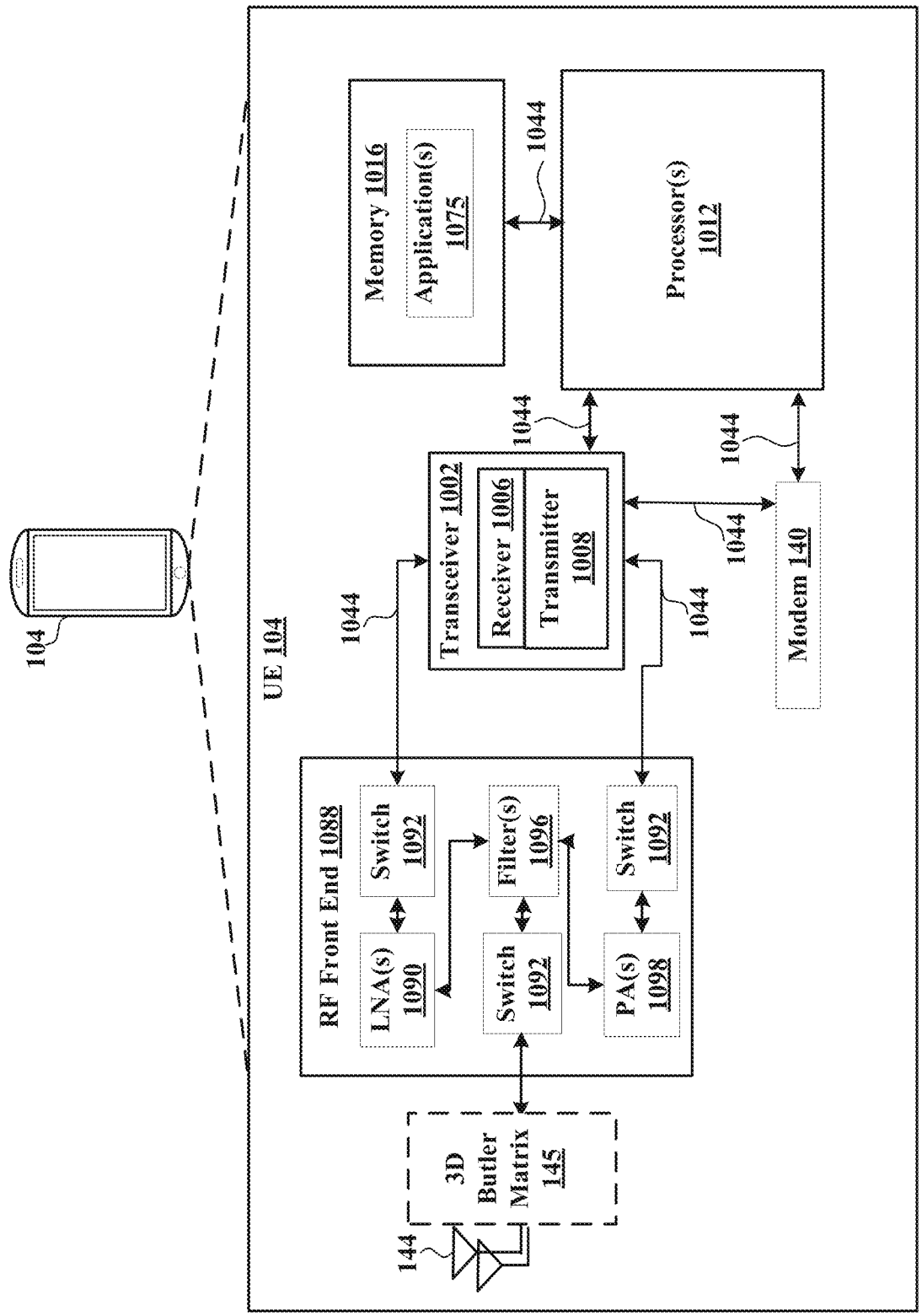
FIG. 10 is a block diagram illustrating example components of an example UE, in accordance with various aspects of the present disclosure.

Referring to FIG. 10, one example of an implementation of UE 104 may include a variety of components, some of which have already been described above and are described further herein, including components such as one or more processors 1012 and memory 1016 and transceiver 1002 in communication via one or more buses 1044, which may operate in conjunction with modem 140, array antenna 144, and/or 3D Butler matrix 145 to enable one or more of the functions described herein related to beamforming in multi-antenna wireless communication. In FIG. 10, 3D Butler matrix 145 is configured and arranged to couple array antenna 144 with an RF front end 1088 of the UE 104. However, the present aspects are not so limited. For example, in an alternative aspect, 3D Butler matrix 145 may be configured and arranged to couple RF front end 1088 with transceiver 1002.

In an aspect, the one or more processors 1012 can include a modem 140 and/or can be part of the modem 140 that uses one or more modem processors. Thus, the various functions described herein with reference to beamforming may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 140 described herein with reference to beamforming may be performed by transceiver 1002.

Also, memory 1016 may be configured to store data used herein and/or local versions of applications 1075 being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes and/or data associated therewith, when UE 104 is operating at least one processor 1012 to execute beamforming functionality described herein.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, signal-to-noise ratio (SNR), reference signal received power (RSRP), received signal strength indicator (RSSI), etc. Transmitter 1008 may include hardware, firmware, and/or software code executable by a processor for transmitting data, the code comprising instructions and being stored in a memory (e.g., computer-readable medium). A suitable example of transmitter 1008 may include, but is not limited to, an RF transmitter.

Moreover, in an aspect, UE 104 may include RF front end 1088, which may operate in communication with 3D Butler matrix 145, one or more antennas 144, and transceiver 1002 for receiving and transmitting radio transmissions, for example, wireless communications transmitted by at least one base station 102 or wireless transmissions transmitted by UE 104. RF front end 1088 may be connected to one or more antennas 144 via 3D Butler matrix 145 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 144 via 3D Butler matrix 145 and RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 140 can configure transceiver 1002 to operate at a specified frequency and power level based on the UE configuration of the UE 104 and the communication protocol used by modem 140.

In an aspect, modem 140 can be a multiband-multimode modem, which can process digital data and communicate with transceiver 1002 such that the digital data is sent and received using transceiver 1002. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 1088, transceiver 1002, 3D Butler matrix 145) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1012 may correspond to one or more of the processors described in connection with UE 1150 in FIG. 11 below. Similarly, the memory 1016 may correspond to the memory described in connection with UE 1150 in FIG. 11 below.

In one configuration, UE 104 or UE 1150 may be an apparatus for multi-antenna wireless communication including means for performing any of the appended claims for multi-antenna wireless communication by a UE. The aforementioned means may be one or more of the aforementioned components of UE 104 and/or processor 1012 of UE 104 configured to perform the functions recited by the aforementioned means. As described supra, processor 1012 may include the TX Processor 1168, the RX Processor 1156, and the controller/processor 1159 of UE 1150 described below with reference to FIG. 11. As such, in one configuration, the aforementioned means may be the TX Processor 1168, the RX Processor 1156, and the controller/processor 1159 configured to perform the functions recited by the aforementioned means.

Figure 11:
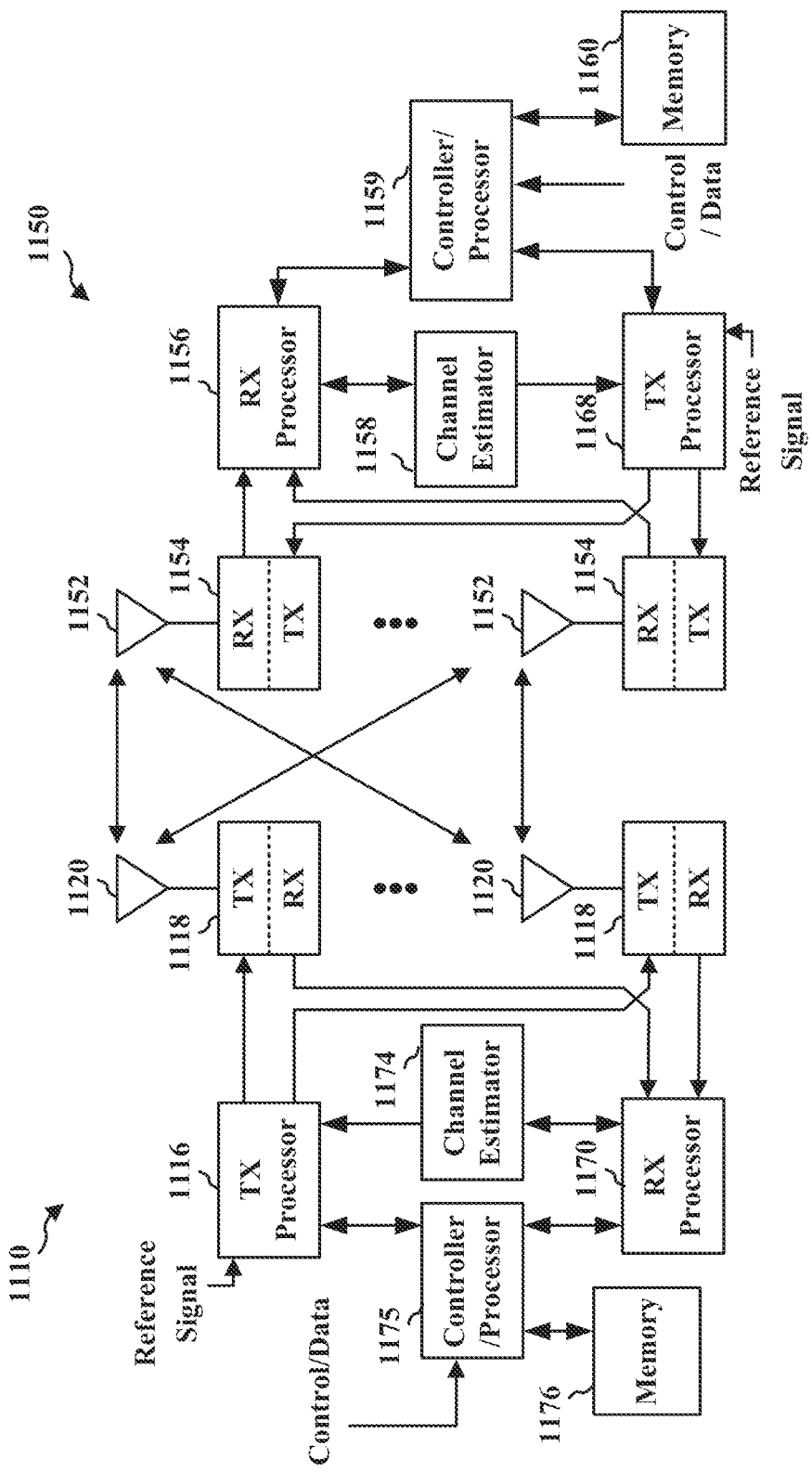
FIG. 11 is a diagram illustrating example components of a base station and a UE in an access network, in accordance with various aspects of the present disclosure.

FIG. 11 is a block diagram of a base station 1110 in communication with a UE 1150 in an access network, where the base station 1110 may be an example implementation of base station 102 and where UE 1150 may be an example implementation of UE 104. Although not illustrated in FIG. 11, in some aspects, the base station 1110 may include a 3D Butler matrix and/or an RF front end that are configured and arranged to couple multiple antennas 1120 of the base station 1110 with transceiver 1118 of the base station 1110, as described herein with reference to various aspects. Similarly, although not illustrated in FIG. 11, in some aspects, the UE 1150 may include a 3D Butler matrix and/or an RF front end that are configured and arranged to couple multiple antennas 1152 of the UE 1150 with transceiver 1154 of the UE 1150, as described herein with reference to various aspects.

In the DL, IP packets from the EPC 160 may be provided to a controller/processor 1175. The controller/processor 1175 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 1175 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 1116 and the receive (RX) processor 1170 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 1116 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream may then be provided to a different antenna 1120 via a separate transmitter 1118TX.

Each transmitter 1118TX may modulate an RF carrier with a respective spatial stream for transmission.

At the UE 1150, each receiver 1154RX receives a signal through its respective antenna 1152. Each receiver 1154RX recovers information modulated onto an RF carrier and provides the information to the receive (RX) processor 1156. The TX processor 1168 and the RX processor 1156 implement layer 1 functionality associated with various signal processing functions. The RX processor 1156 may perform spatial processing on the information to recover any spatial streams destined for the UE 1150. If multiple spatial streams are destined for the UE 1150, they may be combined by the RX processor 1156 into a single OFDM symbol stream. The RX processor 1156 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 1110. These soft decisions may be based on channel estimates computed by the channel estimator 1158. The soft decisions are then decoded and deinterleaved to recover the data and control signals that were originally transmitted by the base station 1110 on the physical channel. The data and control signals are then provided to the controller/processor 1159, which implements layer 3 and layer 2 functionality.

The controller/processor 1159 can be associated with a memory 1160 that stores program codes and data. The memory 1160 may be referred to as a computer-readable medium. In the UL, the controller/processor 1159 provides demultiplexing between transport and logical channels, packet reassembly, deciphering, header decompression, and control signal processing to recover IP packets from the EPC 160. The controller/processor 1159 is also responsible for error detection using an ACK and/or NACK protocol to support HARQ operations.

Similar to the functionality described in connection with the DL transmission by the base station 1110, the controller/processor 1159 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 1158 from a reference signal or feedback transmitted by the base station 1110 may be used by the TX processor 1168 to select the appropriate coding and modulation schemes, and to facilitate spatial processing. The spatial streams generated by the TX processor 1168 may be provided to different antenna 1152 via separate transmitters 1154TX. Each transmitter 1154TX may modulate an RF carrier with a respective spatial stream for transmission.

The UL transmission is processed at the base station 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX processor 1170.

The controller/processor 1175 can be associated with a memory 1176 that stores program codes and data. The memory 1176 may be referred to as a computer-readable medium. In the UL, the controller/processor 1175 provides demultiplexing between transport and logical channels, packet reassembly, deciphering, header decompression, control signal processing to recover IP packets from the UE 1150. IP packets from the controller/processor 1175 may be provided to the EPC 160. The controller/processor 1175 is also responsible for error detection using an ACK and/or NACK protocol to support HARQ operations.

At least one of the TX processor 1168, the RX processor 1156, and the controller/processor 1159 may be configured to perform aspects in connection with beamforming in multi-antenna wireless communication in FIG. 1.

At least one of the TX processor 1116, the RX processor 1170, and the controller/processor 1175 may be configured to perform aspects in connection with beamforming in multi-antenna wireless communication in FIG. 1.

Figure 12:
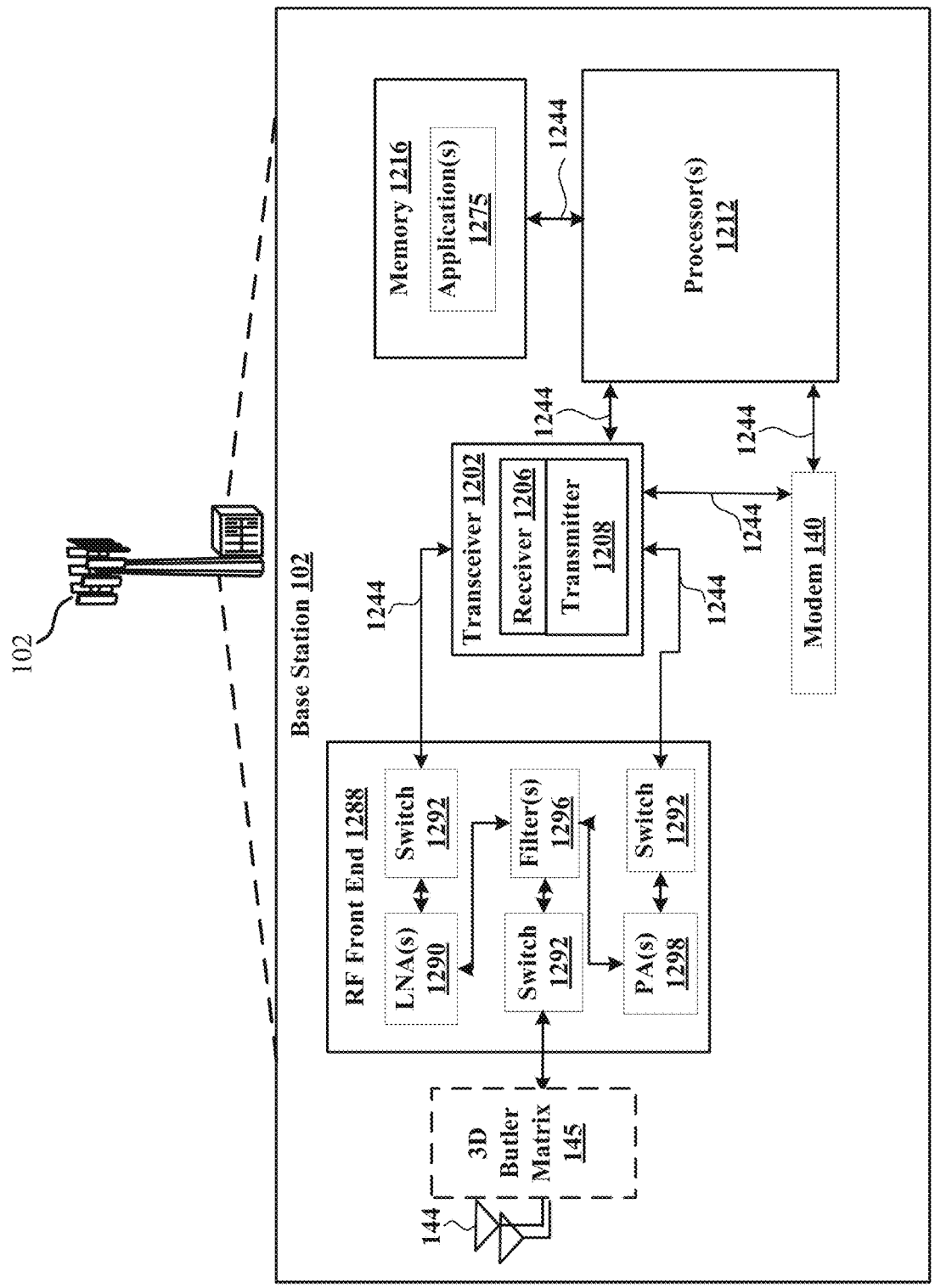
FIG. 12 is a block diagram illustrating example components of an example base station, in accordance with various aspects of the present disclosure.

Referring to FIG. 12, one example of an implementation of base station 102 may include a variety of components, some of which have already been described above and are described further herein, including components such as one or more processors 1212 and memory 1216 and transceiver 1202 in communication via one or more buses 1244, which may operate in conjunction with modem 140, array antenna 144, and/or 3D Butler matrix 145 to enable one or more of the functions described herein related to beamforming in multi-antenna wireless communication. In FIG. 12, 3D Butler matrix 145 is configured and arranged to couple array antenna 144 with an RF front end 1288 of the base station 102. However, the present aspects are not so limited. For example, in an alternative aspect, 3D Butler matrix 145 may be configured and arranged to couple RF front end 1288 with transceiver 1202.

In an aspect, the one or more processors 1212 can include a modem 140 and/or can be part of the modem 140 that uses one or more modem processors. Thus, the various functions described herein with reference to beamforming may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 described herein with reference to beamforming may be performed by transceiver 1202.

Also, memory 1216 may be configured to store data used herein and/or local versions of applications 1275 being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes and/or data associated therewith, when base station 102 is operating at least one processor 1212 to execute beamforming functionality described herein.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one UE 104. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, base station 102 may include RF front end 1288, which may operate in communication with 3D Butler matrix 145, one or more antennas 144, and transceiver 1202 for receiving and transmitting radio transmissions, for example, wireless communications transmitted by other base stations 102 or wireless transmissions transmitted by UE 104. RF front end 1288 may be connected to one or more antennas 144 via 3D Butler matrix 145 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 144 via 3D Butler matrix 145 and RF front end 1288. In an aspect, transceiver 1202 may be tuned to operate at specified frequencies such that base station 102 can communicate with, for example, one or more UEs 104 or one or more cells associated with one or more other base stations 102. In an aspect, for example, modem 140 can configure transceiver 1202 to operate at a specified frequency and power level based on the base station configuration of the base station 102 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of base station 102 (e.g., RF front end 1288, transceiver 1202, 3D Butler matrix 145) to enable transmission and/or reception of signals from the network based on a specified modem configuration. In an aspect, the modem configuration can be based on the mode of the modem and the frequency band in use. In another aspect, the modem configuration can be based on base station configuration information associated with base station 102.

In an aspect, the processor(s) 1212 may correspond to one or more of the processors described in connection with base station 1110 in FIG. 11 above. Similarly, the memory 1216 may correspond to the memory described in connection with base station 1110 in FIG. 11 above.

In one configuration, base station 102 or base station 1110 may be an apparatus for multi-antenna wireless communication including means for performing any of the appended claims for multi-antenna wireless communication by a base station. The aforementioned means may be one or more of the aforementioned components of base station 102 and/or processor 1212 of base station 102 configured to perform the functions recited by the aforementioned means. As described supra, processor 1212 may include the TX Processor 1116, the RX Processor 1170, and the controller/processor 1175 of base station 1110 described above with reference to FIG. 11. As such, in one configuration, the aforementioned means may be the TX Processor 1116, the RX Processor 1170, and the controller/processor 1175 configured to perform the functions recited by the aforementioned means.

Some Further Example Implementations

An example apparatus for multi-antenna wireless communication, comprising: a first layer 2-dimensional (2D) Butler matrix having first layer input ports and first layer output ports; a second layer 2D Butler matrix having second layer input ports and second layer output ports; and a first layer to second layer switch configurable, based on a control signal applied to a control input pin of the first layer to second layer switch, to selectively connect the first layer output ports of the first layer 2D Butler matrix to at least a subset of the second layer input ports of the second layer 2D Butler matrix.

The above example apparatus, wherein each one of the first layer 2D Butler matrix and the second layer 2D Butler matrix comprises at least one Butler matrix having input ports and output ports, wherein the at least one Butler matrix is operable to activate, in response to an activation of each one of the input ports, all of the output ports with a uniform phase distribution and a constant phase difference between adjacent output ports, wherein different input ports of the at least one Butler matrix, when activated, cause a different phase pattern on the output ports of the at least one Butler matrix.

Any of the above example apparatuses, further comprising an array antenna that includes a plurality of antenna elements, wherein each one of the plurality of antenna elements is associated with one output port of the second layer 2D Butler matrix.

Any of the above example apparatuses, wherein each one of the plurality of antenna elements is coupled with an output port of the second layer 2D Butler matrix via a configurable circuit comprising one or more switches or amplifiers, wherein the configurable circuit is configurable into a reception mode for signal reception by the array antenna and also configurable into a transmission mode for signal transmission by the array antenna.

Any of the above example apparatuses, further comprising a modem operable to select one or more input ports of the first layer 2D Butler matrix for communication of one or more streams by the array antenna over one or more beams.

Any of the above example apparatuses, further comprising a transceiver operable as a transmitter to output the one or more streams or operable as a receiver to input the one or more streams.

Any of the above example apparatuses, wherein different input ports of the first layer 2D Butler matrix correspond to different beam azimuths or elevations, wherein the modem is further operable to select the one or more input ports that are associated with a desired beam azimuth or elevation.

Any of the above example apparatuses, wherein the modem is further operable to apply a control signal to the control input pin of the first layer to second layer switch, wherein the control signal is associated with a desired beam azimuth or elevation.

Any of the above example apparatuses, wherein the first layer 2D Butler matrix comprises a single Butler matrix, wherein the second layer 2D Butler matrix comprises a plurality of Butler matrices, wherein each input port of the single Butler matrix is associated with a different beam azimuth or elevation.

Any of the above example apparatuses, wherein the modem is further operable to apply a control signal to the control input pin of the first layer to second layer switch, wherein the control signal is indicative of a desired beam azimuth or elevation, wherein the control signal controls the first layer to second layer switch to connect output ports of the first layer 2D Butler matrix to one selected input port of each Butler matrix in the second layer 2D Butler matrix.

Any of the above example apparatuses, wherein the modem is operable, at any given time, to select only one input port of the single Butler matrix corresponding to only one beam azimuth or elevation.

Any of the above example apparatuses, wherein the modem is operable to select more than one of the input ports of the single Butler matrix corresponding to more than one beam azimuth or elevation.

Any of the above example apparatuses, wherein the modem is operable to apply a control signal to the control input pin of the first layer to second layer switch, wherein the control signal is indicative of only one beam azimuth or elevation associated with only one input port in each Butler matrix in the second layer 2D Butler matrix.

Any of the above example apparatuses, wherein the modem is further operable to apply a control signal to the control input pin of the first layer to second layer switch, wherein the control signal is indicative of more than one beam azimuth or elevation associated with more than one input port in each Butler matrix in the second layer 2D Butler matrix.

Any of the above example apparatuses, wherein the apparatus comprises a base station or a user equipment (UE).

An example method of multi-antenna wireless communication, comprising: selecting one or more input ports of a first layer two-dimensional (2D) Butler matrix for communication of one or more streams by an array antenna over one or more beams; applying a control signal to a control input pin of a first layer to second layer switch configurable, based on the control signal, to selectively connect first layer output ports of the first layer 2D Butler matrix to at least a subset of second layer input ports of a second layer 2D Butler matrix; and transmitting or receiving one or more streams by an array antenna over one or more beams, wherein the array antenna includes a plurality of antenna elements, wherein each one of the plurality of antenna elements is associated with one output port of the second layer 2D Butler matrix.

The above example method, further comprising the operations of any of the above apparatuses for multi-antenna wireless communication.

An apparatus comprising a transceiver; a memory configured to store instructions; and one or more processors communicatively coupled with the transceiver and the memory, wherein the one or more processors are configured to execute the instructions to perform the operations of any of the above methods of multi-antenna wireless communication.

An apparatus for wireless communication, comprising means for performing the operations of any of the above methods of multi-antenna wireless communication.

A computer-readable medium, comprising code executable by one or more processors to perform the operations of any of the above methods of multi-antenna wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for multi-antenna wireless communication, comprising:
    a first layer 2-dimensional (2D) Butler matrix having first layer input ports and first layer output ports;
    a second layer 2D Butler matrix having second layer input ports and second layer output ports; and
    a first layer to second layer switch configurable, based on a control signal applied to a control input pin of the first layer to second layer switch, to selectively connect the first layer output ports of the first layer 2D Butler matrix to at least a subset of the second layer input ports of the second layer 2D Butler matrix.

2. The apparatus of claim 1, wherein each one of the first layer 2D Butler matrix and the second layer 2D Butler matrix comprises at least one Butler matrix having input ports and output ports, wherein the at least one Butler matrix is operable to activate, in response to an activation of each one of the input ports, all of the output ports with a uniform phase distribution and a constant phase difference between adjacent output ports, wherein different input ports of the at least one Butler matrix, when activated, cause a different phase pattern on the output ports of the at least one Butler matrix.

3. The apparatus of claim 2, further comprising an array antenna that includes a plurality of antenna elements, wherein each one of the plurality of antenna elements is associated with one output port of the second layer 2D Butler matrix.

4. The apparatus of claim 3, wherein each one of the plurality of antenna elements is coupled with an output port of the second layer 2D Butler matrix via a configurable circuit comprising one or more switches or amplifiers, wherein the configurable circuit is configurable into a reception mode for signal reception by the array antenna and also configurable into a transmission mode for signal transmission by the array antenna.

5. The apparatus of claim 3, further comprising a modem operable to select one or more input ports of the first layer 2D Butler matrix for communication of one or more streams by the array antenna over one or more beams.

6. The apparatus of claim 5, further comprising a transceiver operable as a transmitter to output the one or more streams or operable as a receiver to input the one or more streams.

7. The apparatus of claim 5, wherein different input ports of the first layer 2D Butler matrix correspond to different beam azimuths or elevations, wherein the modem is further operable to select the one or more input ports that are associated with a desired beam azimuth or elevation.

8. The apparatus of claim 5, wherein the modem is further operable to apply a control signal to the control input pin of the first layer to second layer switch, wherein the control signal is associated with a desired beam azimuth or elevation.

9. The apparatus of claim 5, wherein the first layer 2D Butler matrix comprises a single Butler matrix, wherein the second layer 2D Butler matrix comprises a plurality of Butler matrices, wherein each input port of the single Butler matrix is associated with a different beam azimuth or elevation.

10. The apparatus of claim 9, wherein the modem is further operable to apply a control signal to the control input pin of the first layer to second layer switch, wherein the control signal is indicative of a desired beam azimuth or elevation, wherein the control signal controls the first layer to second layer switch to connect output ports of the first layer 2D Butler matrix to one selected input port of each Butler matrix in the second layer 2D Butler matrix.

11. The apparatus of claim 9, wherein the modem is operable, at any given time, to select only one input port of the single Butler matrix corresponding to only one beam azimuth or elevation.

12. The apparatus of claim 9, wherein the modem is operable to select more than one of the input ports of the single Butler matrix corresponding to more than one beam azimuth or elevation.

13. The apparatus of claim 9, wherein the modem is operable to apply a control signal to the control input pin of the first layer to second layer switch, wherein the control signal is indicative of only one beam azimuth or elevation associated with only one input port in each Butler matrix in the second layer 2D Butler matrix.

14. The apparatus of claim 9, wherein the modem is further operable to apply a control signal to the control input pin of the first layer to second layer switch, wherein the control signal is indicative of more than one beam azimuth or elevation associated with more than one input port in each Butler matrix in the second layer 2D Butler matrix.

15. The apparatus of claim 1, wherein the apparatus comprises a base station.

16. The apparatus of claim 1, wherein the apparatus comprises a user equipment (UE).

17. A method of multi-antenna wireless communication, comprising:
    selecting one or more input ports of a first layer two-dimensional (2D) Butler matrix for communication of one or more streams by an array antenna over one or more beams;
    applying a control signal to a control input pin of a first layer to second layer switch configurable, based on the control signal, to selectively connect first layer output ports of the first layer 2D Butler matrix to at least a subset of second layer input ports of a second layer 2D Butler matrix; and
    transmitting or receiving one or more streams by an array antenna over one or more beams, wherein the array antenna includes a plurality of antenna elements, wherein each one of the plurality of antenna elements is associated with one output port of the second layer 2D Butler matrix.

18. An apparatus comprising:
    a transceiver:
    a memory configured to store instructions; and
    one or more processors communicatively coupled with the transceiver and the memory, wherein the one or more processors are configured to execute the instructions to perform multi-antenna wireless communication comprising:

selecting one or more input ports of a first layer two-dimensional (2D) Butler matrix for communication of one or more streams by an array antenna over one or more beams;

applying a control signal to a control input pin of a first layer to second layer switch configurable, based on the control signal, to selectively connect first layer output ports of the first layer 2D Butler matrix to at least a subset of second layer input ports of a second layer 2D Butler matrix; and transmitting or receiving one or more streams by an array antenna over one or more beams, wherein the array antenna includes a plurality of antenna elements, wherein each one of the plurality of antenna elements is associated with one output port of the second layer 2D Butler matrix.

19. A non-transitory computer-readable medium comprising code executable by one or more processors to perform multi-antenna wireless communication comprising:

selecting one or more input ports of a first layer two-dimensional (2D) Butler matrix for communication of one or more streams by an array antenna over one or more beams;

applying a control signal to a control input pin of a first layer to second layer switch configurable, based on the control signal, to selectively connect first layer output ports of the first layer 2D Butler matrix to at least a subset of second layer input ports of a second layer 2D Butler matrix; and transmitting or receiving one or more streams by an array antenna over one or more beams, wherein the array antenna includes a plurality of antenna elements, wherein each one of the plurality of antenna elements is associated with one output port of the second layer 2D Butler matrix.

20. An apparatus for multi-antenna wireless communication, comprising:

means for selecting one or more input ports of a first layer two-dimensional (2D) Butler matrix for communication of one or more streams by an array antenna over one or more beams;

means for applying a control signal to a control input pin of a first layer to second layer switch configurable, based on the control signal, to selectively connect first layer output ports of the first layer 2D Butler matrix to at least a subset of second layer input ports of a second layer 2D Butler matrix; and means for transmitting or receiving one or more streams by an array antenna over one or more beams, wherein the array antenna includes a plurality of antenna elements, wherein each one of the plurality of antenna elements is associated with one output port of the second layer 2D Butler matrix.

* * * * *